United States Patent [19]

Ikeura

[11] 4,345,557
[45] Aug. 24, 1982

[54] IDLE SPEED CONTROL METHOD AND SYSTEM FOR AN INTERNAL COMBUSTION ENGINE OF AN AUTOMOBILE VEHICLE

[75] Inventor: Kenji Ikeura, Yokosuka, Japan

[73] Assignee: Nissan Motor Company, Limited, Kanagawa, Japan

[21] Appl. No.: 154,051

[22] Filed: May 28, 1980

[30] Foreign Application Priority Data

May 29, 1979 [JP] Japan .................................. 54-65663

[51] Int. Cl.³ ......................................... F02D 11/10
[52] U.S. Cl. ................................................. 123/339
[58] Field of Search ....................... 123/440, 489, 339

[56] References Cited

U.S. PATENT DOCUMENTS

| | | | |
|---|---|---|---|
| 4,203,395 | 5/1980 | Cromas et al. | 123/339 |
| 4,231,335 | 11/1980 | Hallberg | 123/440 |
| 4,252,098 | 2/1981 | Tomczak | 123/440 |
| 4,291,656 | 9/1981 | Miyagi | 123/339 |

Primary Examiner—Ronald B. Cox
Attorney, Agent, or Firm—Lowe, King, Price & Becker

[57] ABSTRACT

An intake air flow rate control method and system comprises a circuit for determining a basic control ratio corresponding to an engine or engine coolant temperature and a plurality of circuits for correcting the basic control ratio corresponding to engine driving conditions and engine load conditions. Additionally, the system discriminates among engine driving condition to determine whether feedback control or open loop control is to be carried out. A circuit for discriminating among the engine driving conditions improves response characteristic to reduce lag that tends to occur between feedback control and open loop control when control operation is switched between feedback control and open loop control.

63 Claims, 25 Drawing Figures

IDLE SPEED CONTROL METHOD AND SYSTEM FOR AN INTERNAL COMBUSTION ENGINE OF AN AUTOMOBILE VEHICLE

BACKGROUND OF THE INVENTION

1. Field of the Invention

The present invention relates generally to an intake air flow rate control system for an internal combustion engine of an automotive vehicle. More specifically, the present invention relates to an automatic electronic intake air flow rate control system in use with a microcomputer for the internal combustion engine of the automotive vehicle, particularly for controlling air flow rate during idling of the engine of the vehicle.

2. Description of the Prior Art

In recent years, pollution of the atmosphere by nitrogen oxides $NO_x$, carbon monoxide CO, gaseous sulfurous acid and so on produced in the exhaust gas of automotive vehicles has become a serious social problem. In addition to this, the price of fuel, i.e. gasoline or petrol, for automotive vehicles has become higher and higher, because of the limited resources thereof. For preventing atmospheric pollution caused by exhaust gas of vehicles and for improving economic fuel use, it has become necessary to control engine speed accurately even when the vehicle engine is idling.

Further, it has been required to control the engine speed corresponding to various control parameters, such as, kind of transmission, or drive gear neutral position of the transmission on or off condition of the air conditioner and so on by which engine load condition is varied. Particularly during idling condition, since the idle engine speed is relatively slow so as not to drive the engine, the required air flow rate is varied corresponding to engine load. To this end, various control systems have been developed for controlling engine speed corresponding to load applied to engine. Again, the conventional engine speed control systems have been controlling engine speed corresponding to only one or two of engine speed control parameters. Even if it is attempted to combine the conventional control systems that operate with respect to the various control parameters, such combination will be impossible to complete for stabilizing engine speed, because the systems have not been designed to be combinable.

Further, in the conventional systems, either open loop control or the feedback control has been used for controlling the engine speed. However, for controlling the engine speed completely, it is desirable to selectively use both open loop and feedback controls. If feedback contol and open loop control as in the prior art are combined to be selectively applied, there is further required a means for determining whether feedback control can be carried out during particular engine driving conditions. As a further requirement an automatic switching means responsive to either feedback control or open loop control carries out control. However, there have not been developed any control system for effectively switching control operation between open loop and feedback (closed loop) selectively, before the present invention.

Moreover, the conventional control systems have generally employed analog circuitry which have required a considerable amount of electric current. In such systems, control inertia has been quite large so as to cause delay of response with respect to change of control parameters.

In consideration of the above-mentioned disadvantages or inconveniences of the conventional control systems, the present invention provides an engine control method and system, generally for engine idling, which can improve all the defects in the prior arts.

SUMMARY OF THE INVENTION

The present invention controls engine speed during idling by controlling the air flow rate through an idle port passage and a passage which bypasses the throttle valve in an intake air passage.

The present invention is more particularly directed to control of engine idling speed by controlling the intake air flow rate corresponding to or based on engine or coolant temperature. Preferably, the engine speed determined corresponding to the engine or coolant temperature will be corrected corresponding to conditions of other operating parameters, such as the position of a neutral switch of a transmission i.e., manual or automatic, the kind of transmission, whether an air conditioner is operating, and so on. Further, if will also be preferable to increase the reference engine speed, which is a target engine speed determined based on the coolant temperature and other parameters, when battery voltage drops. Still further, it will be desirable to allow manual adjustment of the reference engine speed.

Further, it is also required to determine based on engine driving condition whether feedback control or open loop control can be carried out. For carrying out feedback control and open loop control selectively, corresponding to engine driving condition, it is required to improve response characteristics when control operation is switched from feedback control to open loop control or from open loop control to feedback control. Particularly, when the vehicle starts driving or is decelerated, and thereby the control operation is switched from feedback control to open loop control, the control ratio will be corrected responsive to change of required air flow rate due to change of engine load.

During feedback control for the internal combustion engine developed by a microcomputer, a control signal developed by a control signal generator consisting of a proportional element and an integral element is fed back so as to control the air flow rate. In the conventional control system, the constants of the proportional and integral elements are fixed values. The the response time period from the time when the intake air flow rate is varied to the time when the engine speed is actually changed decreases with increase of the engine speed, when the engine speed is relatively low, a slow response delay will undesirably occur, while when the engine speed is relatively high, the response will be excessively fast to possibly cause hunting. To prevent this, it is desirable to vary the proportional and integral constants corresponding to the actual engine speed and difference between the reference designated engine speed and the actual engine speed.

With the above in mind, a principal and general object of the present invention is to provide an intake air flow rate control system which can carry out all the necessary operations automatically.

A more specific object of the present invention is to provide a main control system having a plurality of sub-systems for determining basic control ratio, correcting the basic control ratio corresponding to engine driving condition and engine load condition and switching control operation between feedback control and open loop control.

Another object of the present invention is to provide an intake air flow rate control system capable of improving response characteristics to vary control ratio corresponding to change of required air flow rate.

To achieve the above-mentioned and other objects, an air flow rate control system according to the present invention comprises a means for determining a basic control ratio corresponding to an engine or engine coolant temperature and a plurality of means for correcting the basic control ratio corresponding to engine driving conditions and engine load conditions. Additionally, the system has a means for discriminating among engine driving conditions to determine whether feedback control or open loop control is to be carried out. Such means for discriminating the engine driving condition is incorporated with a means for improving response characteristics to reduce lag between feedback control and open loop control when the control operation is switched between feedback control and open loop control.

Another principal object of the present invention is to provide a method for totally controlling intake air flow rate delivered through an air intake passage.

A further specific object of the present invention is to provide a method for controlling intake air flow rate corresponding to engine or engine coolant temperature, engine driving condition and engine load condition, which method further includes improving response characteristics of control operation when it is switched between feedback control and open loop (closed loop) control.

For the above-mentioned and other objects, the method according to present invention comprises determining basic and fundamental control ratio corresponding to engine or engine coolant temperature, correcting the basic control ratio based on various control parameters each of which indicates engine load condition, discriminating engine driving condition with respect to various inputs to selectively carry out feedback control and open loop control, further correcting the control ratio corresponding to engine driving condition and vehicle driving condition and limiting the control ratio to improve the response characteristics of control operation.

BRIEF DESCRIPTION OF THE DRAWINGS

The present invention will become more fully understood from the detailed description given below, and from accompanying drawings of the preferred embodiment of the present invention, which however, are not to be taken limitative of the present invention in any way, but is for the purpose of elucidation and explanation only.

In the drawings:

FIG. 6 (B) is an explanatory illustration of a register for holding a reference engine speed;

FIG. 7 (B) is a graph of a relationship between increase of voltage and increase of engine speed;

FIGS. 8 (A) to 8 (E) are explanatory illustrations of a process of correcting the reference engine speed by manual operation, in which FIG. 8 (A) shows the analog-digital converted voltage of the external input terminal for manual correction, FIG. 8 (B) shows the value of the voltage of FIG. 8 (A) ANDed by 1100000, FIG. 8 (C) shows the result of AND operation, FIG. 8 (D) shows a value of FIG. 8 (C) shifted right by four bit and FIG. 8 (E) shows simply an 8 bits register;

DESCRIPTION OF THE PREFERRED EMBODIMENT

Figure 1:
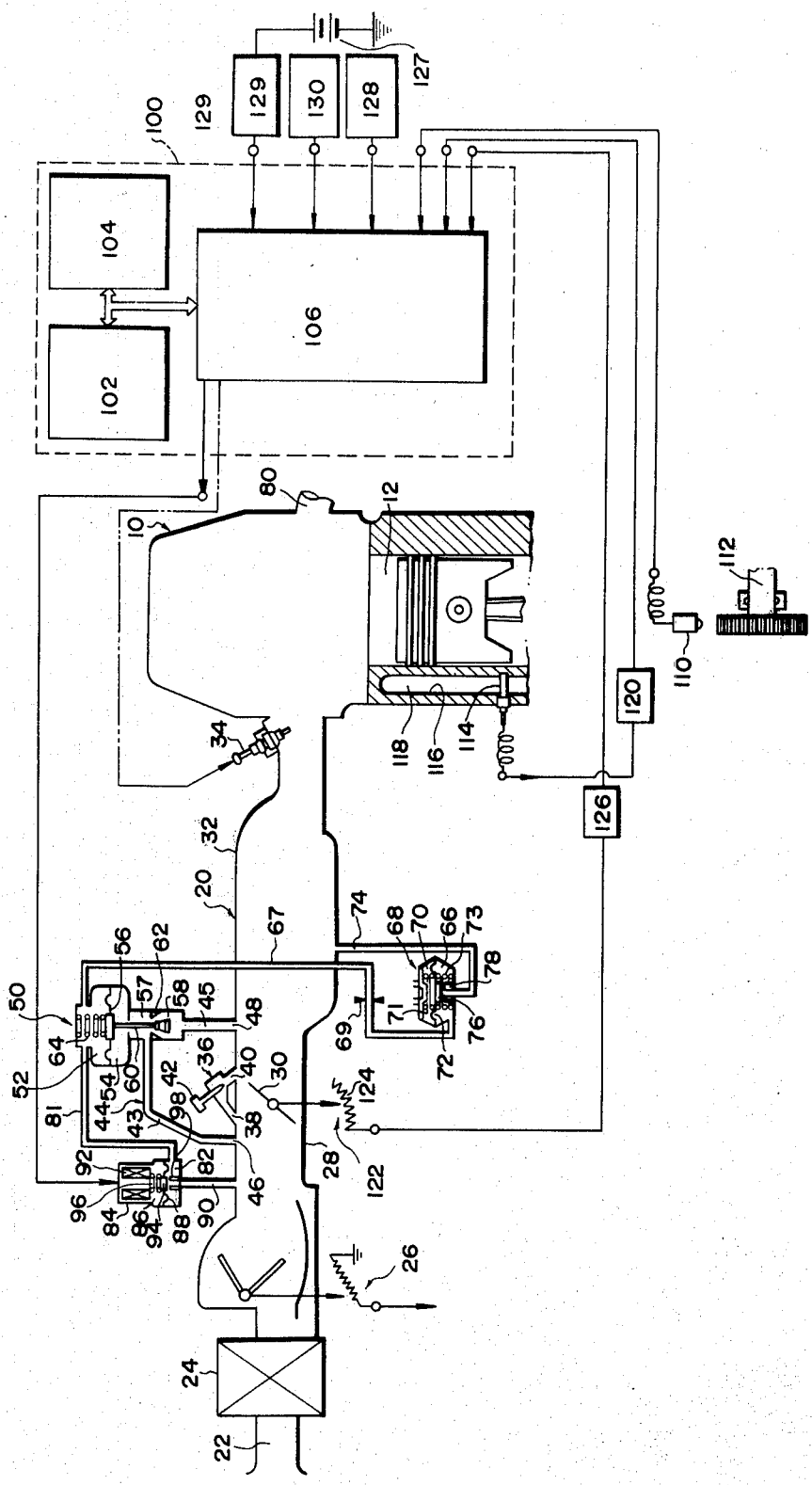
FIG. 1 is a diagramatical illustration of an intake air flow rate for an internal combustion engine according to a preferred embodiment of the present invention.

Referring now to the drawings, and particularly to FIG. 1, there is illustrated and shown the general construction of an internal combustion engine having a computer controlled fuel injection system, to be provided on an automotive vehicle. An air flow rate control system according to the present invention is shown as applied to this internal combustion engine, as an example and for the purposes of explanation only, and should not be taken as limitative of the scope of the present invention. Before moving onto the detailed description, it should be appreciated that the air flow rate control system according to the present invention will be applicable to any type of internal combustion engine which can be controlled by a microcomputer mounted on the vehicle.

In FIG. 1, each of the engine cylinders 12 of an internal combustion engine 10 communicates with an air intake passage generally designated by 20. The air intake passage 20 comprises an air intake duct 22 with an air cleaner 24 for cleaning atmospheric air, an air flow meter 26 provided downstream of the air intake duct 22 to measure the amount of intake air flowing therethrough, a throttle chamber 28 in which is disposed a throttle valve 30 cooperatively coupled with an accelerator pedal (not shown), so as to adjust the flow rate of intake air flowing therethrough, and an intake manifold 32 having a plurality of branches not clearly shown in FIG. 1. Although not clearly illustrated in FIG. 1, the air flow meter is incorporated with another engine control system which determines fuel injection rate, for example. A fuel injector 34 is provided on the intake manifold 32. The rate of injection of fuel through the fuel injector 34 is controlled by an adjusting means, such as, an electromagnetic actuator (not shown). The adjusting means is electrically operated by another control system which determines fuel injection rate, fuel injection timing and so on corresponding to engine condition sensed by various engine parameter sensing means. It should be noted that, although the fuel injector 34 is disposed on the intake manifold 32 in the shown embodiment, it is possible to locate it in the combustion chamber 12 in a per se well known manner.

An idle port passage 36 is provided opening into the throttle chamber 28. One end port 38 of the idle port passage 36 opens upstream of the throttle valve 30, and the other end port 40 opens downstream of the throttle valve 30, so that the idle port passage 36 bypasses the throttle valve 30. An idle adjusting screw 42 is provided in the idle port passage 36. The idle adjusting screw 42 is manually operable, so as to adjust the flow rate of intake air flowing through the idle port passage 36. A bypass passage 44 is also provided to the intake air passage 20.

One end 46 of the bypass passage 44 opens between the air flow meter 26 and the throttle valve 30 and the other end 48 opens downstream of the throttle valve 30, adjacent to the intake manifold 32. Thus the bypass passage 44 bypasses the throttle valve 30 and connects the upstream end of the throttle valve 30 to the intake manifold 32. An idle control valve, generally designated by 50, is provided in the bypass passage 44. The idle control valve 50 generally comprises two chambers 52 and 54 separated by a diaphragm 56. The chamber 54 communicates with the atmosphere. The bypass passage 44 is thus separated by the valve means 50 into two portions 43 and 45 respectively located upstream and downstream of the port 57 of the valve 50. The valve means 50 includes a poppet valve 58 disposed within the portion 57 in a manner that it is movable between two positions, one opening the valve to establish communication between the portions 43 and 45 of the passage 44 and the other closing the same. The poppet valve element 58 has a stem 60 whose end is secured to the diaphragm 56 so as to cooperatively move therewith. The diaphragm 56 is biased downwards in the drawing, so as to release the valve element 58 from a valve seat 62, by a helical compression coil spring 64 disposed within the chamber 52 of the valve means 50. Thereby, the valve 50 is normally opened, and normally communicates the portions 43 and 45 of the bypass passage 44 to one another, via its valve port 57.

The chamber 52 of the idle control valve 50 communicates with one chamber 66 of a pressure regulating valve 68 as the constant vacuum source through a vacuum passage 67. The pressure regulating valve 68 is separated into two chambers 66 and 70 by a diaphragm 72. The chamber 66 of the pressure regulating valve 68 is also communicated with the intake manifold 32, so as to introduce vacuum from the intake manifold 32 thereinto, through a passage 74. The chamber 70 is open to the atmosphere in a per se well known manner. To the diaphragm 72 is secured a valve member 76 which is opposed to a valve seat 78 provided at the end of the passage 74. In the chambers 66 and 70 there are respectively disposed helical compression coil springs 71 and 73. The springs 71 and 73 are generally of equal spring pressure in a position in which the diaphragm 72 is in neutral position. It will be noted that, although not so shown, the chamber 66 can also be connected with a exhaust-gas recirculation (EGR) control valve which recirculates a part of the exhaust gases flowing through an exhaust passage 80 to the intake manifold 32.

The diaphragm 72 is moved upwards or downwards by change of the balance of the vacuum in the chamber 66 and the atmospheric pressure introduced into the chamber 70. By this moving of the diaphragm 72, the valve member 76 is moved toward or away from the valve seat 78, so as to regulate a reference vacuum for the idle control valve 50. The reference vacuum regulated in the pressure regulated valve means 68 is introduced to the chamber 52 of the idle adjusting valve means 50 through the vacuum passage 67 with an orifice 69. The orifice 69 restricts varying of vacuum flowing into the chamber 52 so as to smooth the valve operation.

The chamber 52 of the idle control valve 50 further communicates with a chamber 82 of an intake air valve 84 through an air passage 81. The intake air valve means 84 is divided into two chambers 82 and 86 by a diaphragm 88. The chamber 82 also communicates with the air intake passage 20 upstream of the throttle valve 30 through a passage 90. An electromagnetic actuator 92 is disposed within the chamber 86 and is electrically operated in response to a train of pulse signals generated based on a control signal from the control signal generator in a hereinafter described control unit in use with a microcomputer. On the diaphragm 88 is provided a valve member 94 which is electromagnetically moved by the actuator 92. In practice, by varying the pulse width based on the control signal, the ratio of the energized period and deenergized period of the actuator 92 is varied. Therefore the ratio of the opening period and the closing period of the vale 94 is varied so as to control the flow rate of the air flowing through the intake air valve 84. In the chamber 86 is further provided a helical compression coil spring 96 which biases the diaphragm together with the valve member 94 toward the end of the passage 90, so as to seat the valve member 94 onto a valve set 98 provided at the end of the passage 90. By the vacuum from the pressure regulating valve 68, the diaphragm 56 together with the valve element 58 is moved to control the flow of air through the bypass passage 44. The vacuum in the chamber 52 is controlled with controlling the flow rate of the air flowing through the intake air valve 84 and the air passage 81.

When the internal combustion engine 10 is idling, the throttle valve 30 is generally closed so as to restrict the flow of intake air therethrough. Therefore, during idling of the internal combustion engine 10, the intake air substantially flows through both the idle port passage 36 and the bypass passage 44, which bypasses the throttle valve 30 and connects the upstream and downstream ends of the throttle valve 30. Air flow rate through idle port passage 36 is adjusted by the idle adjusting screw 42, and the air flow rate through the bypass passage 44 is generally controlled by the idle control valve 50. The idle control valve 50 is operated by vacuum fed from the intake manifold 32 through the passage 74, the pressure regulating valve 68, and the vacuum passage 67. The vacuum in the chamber 52 is adjusted by the atmospheric intake air flowing thereinto through the passage 90, the electromagnetic valve 84 and the passage 81. The valve element 58 is operated to control the air flow rate flowing through the passage 44 by the vacuum within the chamber 52. Since the engine speed depends on the intake air flow rate, it can thus be controlled by controlling the air flow rate through the idle port passage 36 and the bypass passage 44 when the internal combustion engine 10 is idling.

It should be noted that, although the control operation for adjusting the intake air flow rate performed by controlling the electromagnetic actuator 92 is described hereafter, the control of air flow rate, and thus the control of engine speed during idling of the internal combustion engine 10, can also be carried out by manually controlling the idle adjusting screw 42. The idle adjusting screw 42 is provided basically for the purpose of the initial idling speed setting.

Now, returning to FIG. 1, a microcomputer 100, employed for automatically controlling the air flow rate, comprises generally a central processing unit (CPU) 102, a memory unit 104, and an input/output unit 106 i.e. an interface. As inputs of the microcomputer 100, there are various sensor signals, such as:

a crank pulse and a crank standard pulse, the crank pulse being generated at every one degree or certain degree more than one of the crank angle, and the crank standard pulse being generated at every given crank standard angle by a crank angle sensor 110 detecting the amount of rotation of a crank shaft 112; the crank pulse and the crank standard pulse are inputted as an input indicating engine speed and engine crank position;

a coolant temperature signal, produced by a temperature sensor 114 which is inserted into a coolant passage 116 provided around the engine cylinder 12, and exposed to the coolant 118; the temperature sensor 114 generates an analog signal in response to the coolant temperature and feeds this signal to the input/output unit 106 through an analog-digital converter (A/D converter) 120, in which the coolant temperature signal is converted in digital code into a binary number signal, which is suitable as an input for the microcomputer;

a throttle valve angle signal, derived from an analog signal produced by a throttle valve angle sensor 122 which comprises a variable resistor 124 and converted into digital code by an A/D converter 126, a signal from a transmission neutral switch 128, which is inputted in the form of an ON/OFF signal, a vehicle speed signal, fed from a vehicle speed sensor 130, which is an ON/OFF signal which becomes ON when the vehicle speed is lower than a given speed, e.g., 8 kph, and is OFF otherwise, and a battery voltage signal, fed from the battery 127 through the A/D converter 129.

It will be appreciated that, although, in the shown embodiment, there is employed a variable resistor 124 in the throttle valve angle sensor 122 for detecting the closed position of the throttle valve, an ON/OFF switch could substitute for the variable register 124, which could become ON when the throttle valve 30 is in the closed position.

In the shown construction, the electromagnetic actuator 92 of the valve means 84 is controlled by a control pulse signal indicative of applied pulse duty cycle. Therefore, the electromagnetic actuator 92 is responsive to such pulse signal to vary the ratio of the energized period to the deenergized period to control the ratio of the period of opening of the valve 84. In practice, the control ratio determined during execution of control programs will be previously written in a register. The register can receive for storage a value within a range 0 to 200. However, considering a range where in the idle control valve means 50 is not responsive, a range of values 20 to 160 corresponding to a range of 10 to 80% of the pulse duty cycle or control ratio is stored. The pulse duty cycle corresponds to a given pulse width, e.g. when the pulse duty is 200, the pulse width corresponding thereto is 51.2 ms (about 20 $H_Z$). When the duty percent is 0, the output of the electromagnetic valve means 84 is 120 mmHg to make the intake air flow rate at a minimum.

Figure 2:
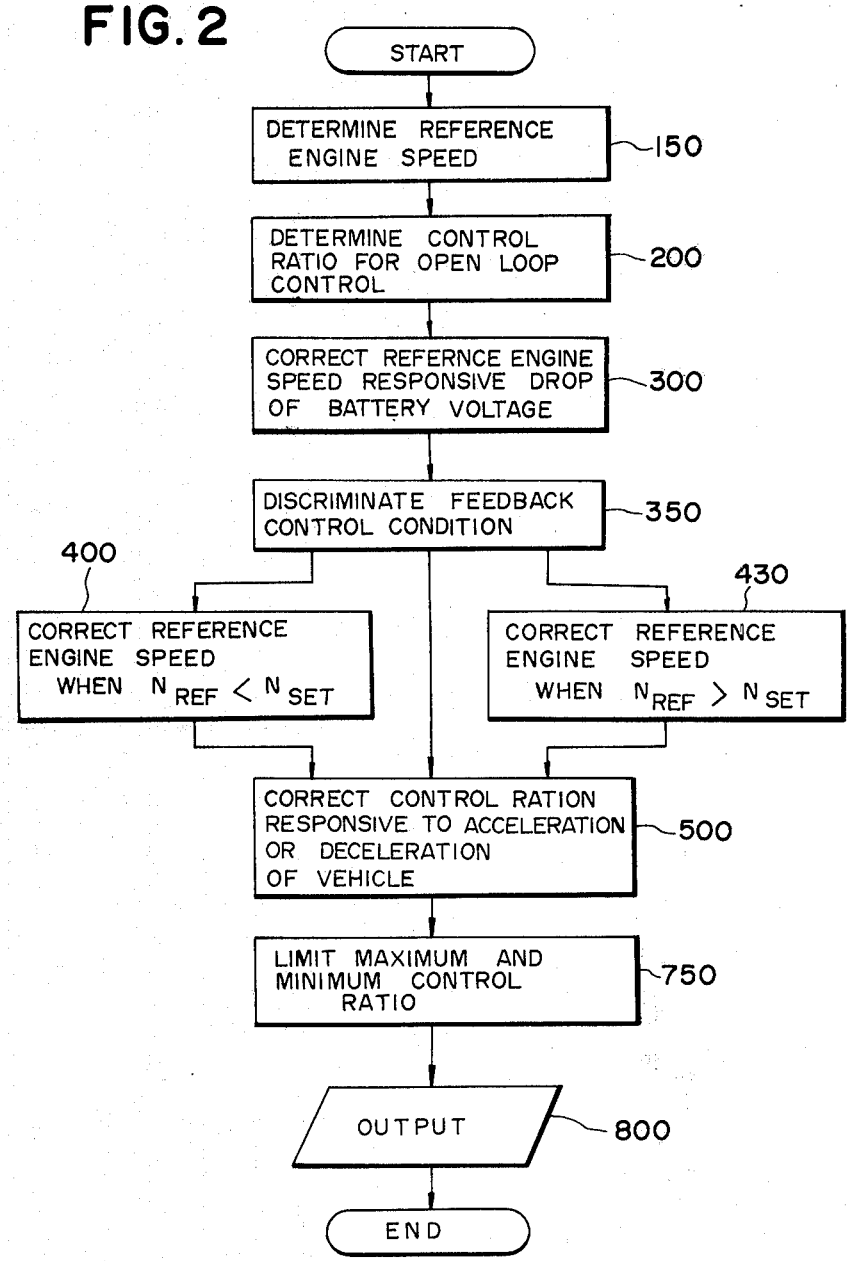
FIG. 2 is a flowchart of a main program having a plurality of sub-routines for carrying out determination of control ratio for controlling a means for actuating valve means for controlling amount of air flowing through a bypass passage.

Referring to FIG. 2, there is shown a flowchart of a main control program for controlling various subprograms. Hereinafter will be described a main control program with respect to the flowchart of FIG. 2 with a brief description of each sub-program. At the start of the main control program, a reference engine speed $N_{SET}$ is determined corresponding to an engine or engine coolant temperature. In the shown embodiment, the engine coolant temperature measured by the coolant temperature sensor 114 is used as a substitute for the engine temperature. At a block 150, the basic reference engine speed is determined by way of table look up, which table is previously determined and stored in the memory unit 104. In the table, the reference engine speed $N_{SET}$ in a temperature range of 0° to 30° C. is kept at a fixed even value. This is intended to prevent the engine from instability of revolution upon initially starting the engine in a cold condition under normal atmospheric temperature. In extraordinarily cold engine conditions or in over-heated conditions, the engine speed is varied for rapidly warming up or cooling the engine.

The basic reference engine speed $N_{SET}$ determined corresponding to the coolant temperature at the block 150, is corrected corresponding to the kind of transmission, drive or neutral gear position of the transmission and on or off condition of an air conditioner. Further, the basic reference engine speed can be corrected by manual operation. Thus the determined reference engine speed is registered in the memory 104.

At a block 200, a basic open loop control ratio is determined. In open loop control, at first, the table indicative of the basic control ratio corresponding to the coolant temperature is looked up. In substantially the same manner to the block 150, the basic control ratio is corrected based on kind of transmission, drive or neutral gear positions of transmission and on or off condition of the air conditioner. At the same time, a minimum duty cycle of the control pulse signal is determined to prevent the control ratio from lowering excessively. As a result of the above mentioned operation, the control pulse signal indicative of the basic control ratio is determined.

At a block 300, the basic control ratio is corrected corresponding to droping reduction of battery voltage. In the hereafter described embodiment, the reference engine speed $N_{SET}$ is increased by 100 r.p.m. within 5 min., when the battery voltage is maintained at less than a predetermined voltage in a given period of time. The corrected reference engine speed $N_{SET}$ is written in memory 104. Corresponding to the reference engine speed $N_{SET}$, pulse duty cycle for the electromagnetic actuator 92 is determined.

At a block 350, the driving condition of the engine is checked to determine whether feedback control can be carried out. For making the above-mentioned decision, the microcomputer 100 processes coolant temperature signal fed from the coolant temperature sensor 114 and other control parameters to determine the driving condition of engine and, thus, to determine the reference engine speed $N_{SET}$ corresponding to determined engine driving condition. The microcomputer 100 further processes a crank angle sensor signal indicative of an actual engine speed $N_{RPM}$ to determine a difference $\Delta N$ between the reference engine speed $N_{SET}$ and the actual engine speed $N_{RPM}$ in feedback control.

For deciding whether feedback content is to be effected, idling is determined. In the shown embodiment, feedback control is carried out under a condition, such as:

four seconds after turning on an idle switch; and
one second after the transmission is in the neutral position or the vehicle speed is less than eight km/h.

Further corresponding to the difference $\Delta N$ of the reference and the actual engine speeds $N_{SET}$ and $N_{RPM}$, it is determined whether feedback control can be carried out. Further, corresponding to the difference of $N_{SET}$ and $N_{RPM}$, feedback control operation is varied. When the actual engine speed $N_{RPM}$ is lower than the reference engine speed $N_{SET}$, feedback control will be carried out at a block 400. On the other hand, if the actual engine speed $N_{RPM}$ is higher than the reference engine speed $N_{SET}$, feedback control will take place at a block 430. If the engine driving condition is not adapted to carrying out of feedback control, then correction of the reference engine speed $N_{SET}$ corresponding to acceleration or decceleration of the vehicle by open loop control takes place at a block 500.

At the blocks 400 and 430, feedback control is carried out. The microcomputer processes the actual engine speed $N_{RPM}$ and the difference $\Delta N$ between the actual engine speed $N_{RPM}$ and the reference engine speed $N_{SET}$ to determine a proportional constant respectively and an integrate constant of a proportional element and an integral element comprising the control signal indicative of pulse duty cycle for the electromagnetic actuator 92 of the valve means 84. The control signal is applied to the actuator 92 to control air flow rate flowing through the valve means 84 and thus to control engine speed so as to reduce difference $\Delta N$ between actual engine speed $N_{RPM}$ and the reference engine speed $N_{SET}$. The control ratio is not linear with variations corresponding to the actual engine speed $N_{RPM}$ and the difference $\Delta N$. Namely, when the difference $\Delta N$ is relatively large, the varying of the control ratio increases and when the difference $\Delta N$ is relatively small, the variation of the control ratio decreases.

At the block 500, open loop control is determined for correcting the control ratio for the electromagnetic actuator 92 of the valve means 84 corresponding to acceleration or decceleration of the vehicle. Particularly, when the vehicle is accelerated or decelerated, required air flow rate is rapidly changed. Open loop control at the block 500 is carried out in a purpose of improving transient response characteristics. Namely, immediately after the throttle position switch 124 turns off and when vehicle speed is less than 8 km/h, the pulse duty cycle of the control signal is decreased to accelerate the vehicle speed. On the other hand, when the throttle position switch 124 turns on, the vehicle speed is more than 8 km/h and the coolant temperature is more than 74 degrees centigrade, the pulse duty cycle of the control signal is increased responsive to deceleration of the vehicle. The pulse duty cycle controls the electromagnetic valve to define its intervals of opening and closing, and the pulse duty cycle is determined corresponding to the engine speed. This will result in effectively and accurately responding to the engine driving condition.

At a block 750, the upper and lower limits of the pulse duty cycle are defined so as to prevent the pulse duty cycle from going into a dead band region of the actuator. For the above mentioned purpose, the upper limit of the pulse duty is 80% of the control ratio which corresponds to 160 of control value, and the lower limit is 10% corresponding to 20 of the control value.

At a block 800, the control ratio determined by the above-mentioned sequence of programs is stored in an output register of the input/output unit 106. On the basis of the determined control ratio, the pulse signal is determined and outputted.

Thereafter, the program comes to END and returns to START. Therefore, the above-mentioned sequence of programs are operated repeatedly to control the idle engine speed accurately.

Figure 3:
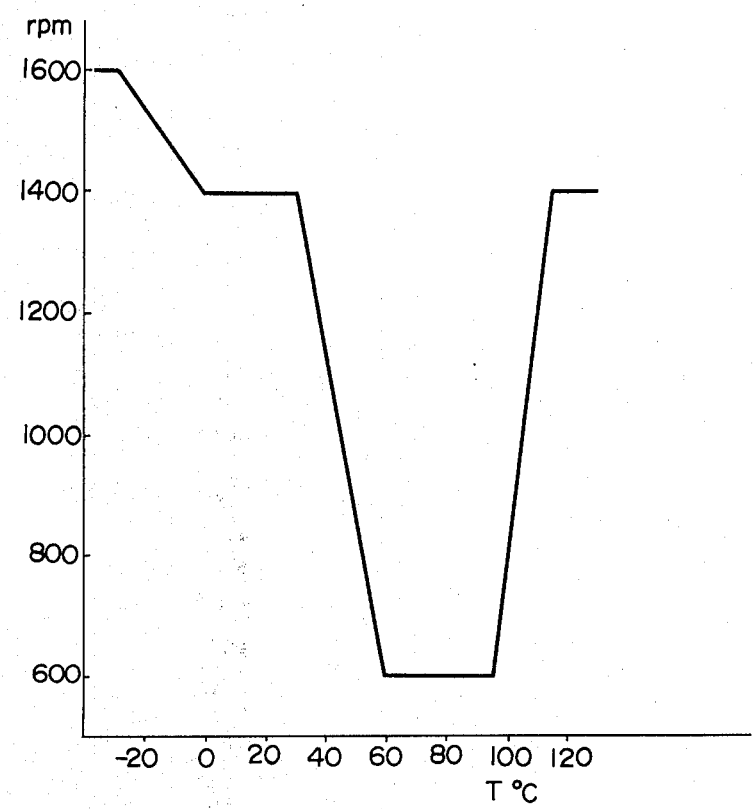
FIG. 3 is a graph showing varying of a reference engine speed corresponding to engine coolant temperature.

FIG. 3 shows a relationship between the coolant temperature T and the reference engine speed $N_{SET}$, as an example of control characteristics, under the condition of open-loop control, according to the present invention. The reference engine speed $N_{SET}$ is the desirable engine speed corresponding to the coolant temperature. The duty cycle of the pulse signal applied to the actuator 92 is determined based on the control signal which corresponds to the reference engine speed $N_{SET}$ in open-loop control. Although the control characteristics according to the present invention is described hereafter with respect to an example using the coolant temperature as a control parameter to determine the desired reference engine speed $N_{SET}$, it will be possible to use other factors as the control parameter. For example, engine temperature can also be used as the control parameter for determining the reference engine speed $N_{SET}$.

As shown in FIG. 3, according to the present invention, in a normal driving condition in which the coolant is warmed-up to 60° C. to 95° C., the idling engine speed is maintained at 600 r.p.m. When the coolant temperature is higher than the abovementioned normal range and is thereby over-heated, the reference idling engine speed is increased to the maximum 1400 r.p.m. so as to increase coolant velocity and to increase the amount of cooling air passing a radiator (not shown) for effectively cooling the internal combustion engine. On the other hand, if the coolant temperature is lower than that of the normal range, the reference idling speed is also increased to the maximum 1600 r.p.m. so as to warm-up the engine rapidly and to stabilize idling engine speed in the cold engine condition. One of the most important concepts of the present invention is to specify the reference engine speed at a specific cold temperature of the coolant. According to the present invention, the specific temperature range is 0° C. to 30° C. and the specific reference engine speed in the specific temperature range is 1400 r.p.m. The specific reference engine speed is kept constant within the above-mentioned specific temperature range. The reason for specifying the coolant temperature range and constant engine speed within this range is that, except in extraordinarily cold weather, the coolant temperature is normally in this range when the engine is first started.

In practical control operation with a microcomputer, the reference engine speed is determined in either of two ways; i.e., open-loop control and feedback control. In feedback control, the duty cycle (the ratio of the pulse width to one pulse cycle) of the pulse signal to be fed back to the electro-magnetic valve means 84 is determined based on the control signal which does not correspond to the reference engine speed $N_{SET}$ as in open-loop control and determined according to the difference between the actual engine speed and the reference engine speed. The feedback control is carried out according to the position of the throttle valve detected or measured by the throttle valve angle sensor 122, the position of the transmission detected by the neutral switch 128, the vehicle speed detected by the vehicle speed switch sensor 130 and so on. In any case, the feedback control to be carried out will be determined with reference to vehicle driving conditions which will be preset in the microcomputer, for example the condition in which the throttle valve is closed and the transmission is in neutral position or the condition in which the throttle valve is closed and the vehicle speed is below 8 km/h. When the vehicle driving condition is not adapted to carry out feedback control, then the microcomputer performs open loop control by table look-up. In open loop control, the reference engine speed $N_{SET}$, i.e. the control signal, is determined with reference to the coolant temperature by table look-up. As appearent from the above, the control signal is the signal which determines the duty cycle of the pulse signal.

The table data is stored in the ROM of the memory unit 104. The table data is looked-up according to the coolant temperature. The following table shows the relationship between the coolant temperature (TW) and corresponding reference engine speed $N_{SET}$, when the table is preset in 32 bytes of ROM.

TABLE

| Coolant temperature TW (°C.) | Reference engine speed $N_{SET}$ (rpm) | Coolant temperature TW | Reference engine speed $N_{SET}$ |
|---|---|---|---|
| 117 and over | 1400 | 36.5 | 1225 |
| 104 | 1000 | 33 | 1325 |
| 94 | 600 | 29.5 | 1400 |
| 80 | 600 | 22 | 1400 |
| 59.5 | 600 | 10 | 1400 |
| 55.5 | 725 | 1 | 1400 |
| 51.5 | 837.5 | −4 | 1425 |
| 47.5 | 937.5 | 10.5 | 1475 |
| 43.5 | 1012.5 | 18.5 | 1525 |
| 40.5 | 1100 | −30 and less | 1600 |

It should be appreciated that in the example shown, the engine speed is increased in steps of 12.5 r.p.m. If the coolant temperature is intermediate between two given values, the reference engine speed $N_{SET}$ will be determined by interpolation.

The correction value obtained from the above-mentioned correcting operation with respect to relationship between the actual engine speed $N_{RPM}$ and the reference engine speed $N_{SET}$ should be further corrected with respect to kind of transmission, battery voltage, and operating position of an air conditioner. Namely, the load subject to the internal combustion engine is varied depending on the kind of transmission. Further, in manual transmission, the load subjecting to engine is greater than that of automatic transmission. On the other hand, when the battery voltage reduces and below twelve volts, it will be required to rapidly recharge the battery to increase the voltage. For this purpose, idling engine speed will necessarily increases. Further, when the air conditioner is on, engine load will be increased for operating the same.

Figure 4:
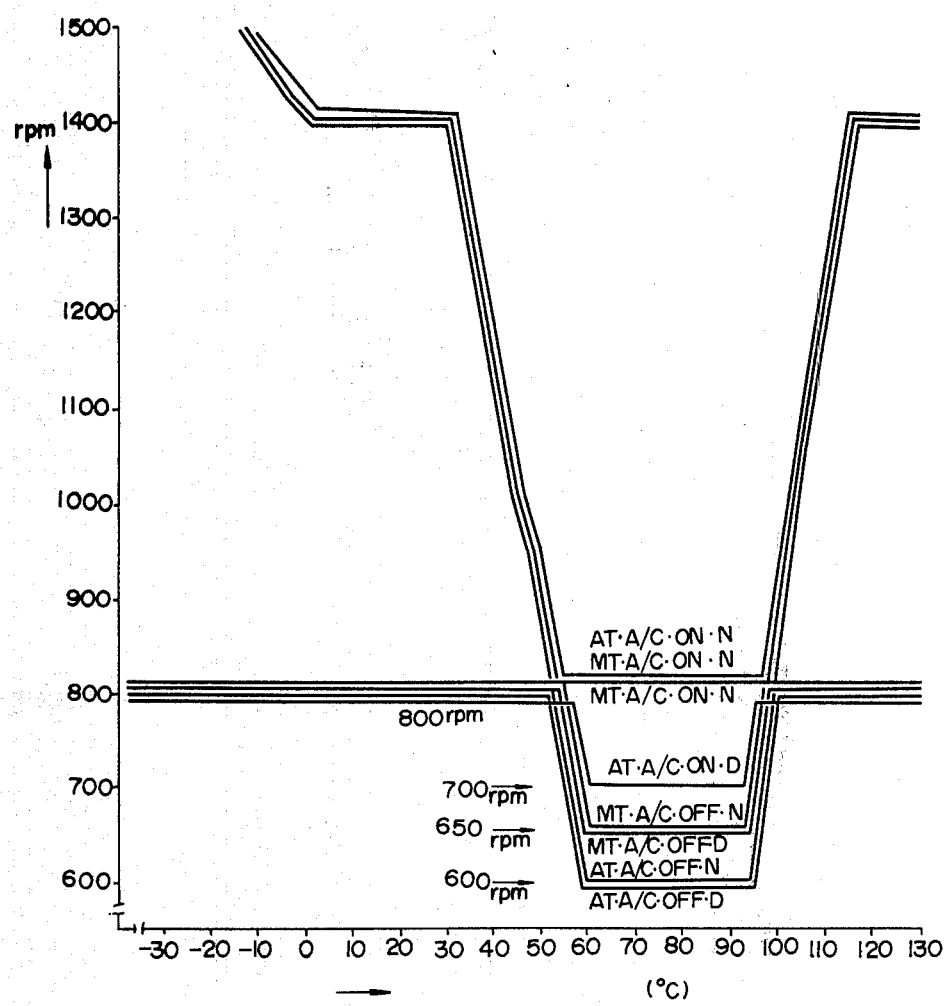
FIG. 4 is a graph showing modifications of the graph of FIG. 2, in which are shown the varying of the reference engine speed according to various other operating parameters of the engine, such as whether the transmission is in drive or neutral, the kind of transmission and whether the air conditioner is operating.

FIG. 4 shows various curves of variation of the reference engine speed $N_{SET}$ corresponding to the coolant temperature. The curves shown in FIG. 3 are modified relative to the curve shown in FIG. 2 which shows the basic reference engine speed $N_{SET}$ determined according to the coolant temperature. The "AT A/C OFF N" indicates a vehicle condition in which the power transmission used in the vehicle is an automatic transmission (AT); the air-conditioner (A/C) is turned off and transmission is in the neutral position (N). The curve identified by "AT A/C OFF N" shows the basic reference engine speed curve. The other curves respectively show corrected reference idling engine speeds $N_{SET}$ with respect to kind of transmission, operating condition of the air-conditioner and the position of the transmission.

When a manual transmission (MT) is used in the vehicle, the minimum reference engine speed is increased by 50 r.p.m. to 650 r.p.m., as in such a case, the load applied to the engine is increased compared to that of the automatic transmission. Further, when the automatic transmission (AT) is in a drive range (D) and therefore the neutral switch is off, the maximum reference engine speed $N_{SET}$ is set to 800 r.p.m. instead of corresponding to the coolant temperature so as to prevent the vehicle from creeping. On the other hand, in a manual transmission (MT), the maximum reference engine speed $N_{SET}$ is set to 800 r.p.m. In general when the manual transmission is in a drive range, for preventing excessively increasing control values of the control signals of feedback control caused by momentary decreasing of engine speed when the clutch is applied to engage, it is required to limit the maximum engine speed. When the transmission is in neutral position (N), for rapidly warming-up the engine in a cold engine condition, or for rapidly radiating engine heat temperature in overheated condition, the reference engine speed is varied corresponding to the coolant temperature.

With respect to the operating condition of the air conditioner, the reference engine speed $N_{SET}$ is generally increased to more than 800 r.p.m. for effectively operating the air conditioner in the operating position (N). However, for an automatic transmission (AT) in the drive range (D), the reference engine speed $N_{SET}$ is normally set to 700 r.p.m. and is set to a maximum 800 r.p.m. for preventing the vehicle from creeping.

According to the above-explained basic point of correction for the basic reference engine speed $N_{SET}$, the reference engine speed is corrected according to the following table II:

TABLE II

| Air conditioner (A/C) | Automatic transmission (AT) | | Manual transmission (MT) | |
|---|---|---|---|---|
| | drive (r.p.m.) | neutral (r.p.m.) | drive (r.p.m.) | neutral (r.p.m.) |
| on | $N_{SET}$ ≦800 ≧700 | $N_{SET}$ ≦800 | $N_{SET}$ =800 | $N_{SET}$ ≧800 |
| off | ≦800 | ≧600 | ≦800 ≧650 | ≧650 |

In the table II, the "drive range" means first speed, second speed, drive and reverse range in the automatic transmission and first to fifth speed and reverse gear in the manual transmission, and the "neutral range" means park and neutral in both the automatic and manual transmissions.

It should be noted that, in FIG. 3, for the purpose of clear indication of each curve of variation of the basic reference engine speed independently corresponding to the coolant temperature, lines which have the same values at least in part are separated from each other.

Figure 5:
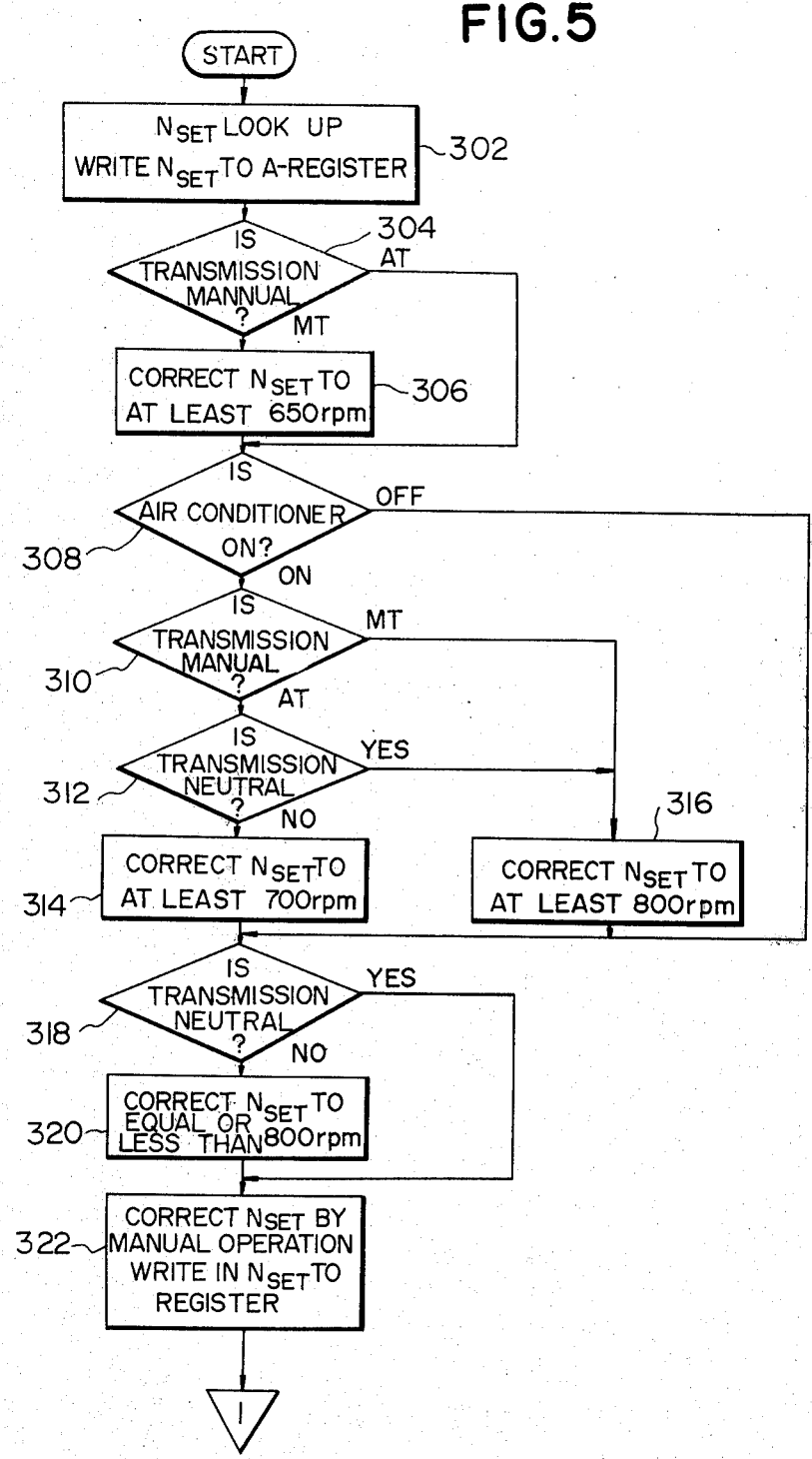
FIG. 5 is a flowchart of a program for correcting the reference engine speed with respect to whether the transmission is in drive or neutral, kind of transmission and whether the air conditioner is operating.

Referring to FIG. 5, in open-loop control, there is illustrated a flowchart of a correction program to be executed for correcting the basic reference engine speed $N_{SET}$ with respect to type of transmission, drive or neutral range of the transmission and whether the air conditioner is on or off. At first, in a processing block 302, the table data set in the ROM according to the characteristics of the basic reference engine speed $N_{SET}$ shown in FIG. 3, is read out corresponding to the coolant temperature signal fed from the coolant temperature sensor 114 of FIG. 1. The reference engine speed $N_{SET}$ determined by the table look-up is written in register A. Thereafter, in a decision block 304, the transmission type is checked as to whether the transmission is of manual type. If the transmission is manual, the reference engine speed $N_{SET}$ stored in register A is corrected at a processing block 306 as follows: when the reference speed $N_{SET}$ is less than 600 r.p.m., it is corrected to 650 r.p.m. When the transmission is automatic, the process jumps to a decision block 308. The process also skips to the decision block 308 after operation at the processing block 306 when the transmission type is manual. Decision block 308 checks to determine if the air-conditioner is on. If the air conditioner is on, decision block 310 checks again to determine whether the transmission type is manual. If so, if the reference engine speed stored in register A is less than 800 r.p.m., it is corrected to 800 r.p.m. in a processing block 316. On the other hand, when the transmission type is automatic, the operating position of the transmission is checked to determine whether it is in the neutral range, in a decision block 312. If so, control skips to the processing block 316. Otherwise, if the reference engine speed $N_{SET}$ stored in register A is less than 700 r.p.m., it is corrected to 700 r.p.m. at a processing block 314. After correcting the reference engine speed $N_{SET}$ in processing blocks 314 and 316 or when the air conditioner is to be off in the decision block 308, a decision block 318 checks to determine whether the transmission is in neutral range. When the transmission is in neutral range, control jumps to a processing block 322. In the processing block 322, the reference engine speed $N_{SET}$ is manually corrected in steps of 50 r.p.m. The manual correction input is obtained from an external input terminal. The method of manually correcting the reference engine speed $N_{SET}$ will be described in detail below with reference to FIGS. 8(A) and 8(B). On the other hand, if the decision of the block 318 is No, the storage of the register A is corrected to equal to or less than 800 r.p.m., at a block 320.

Figure 6:
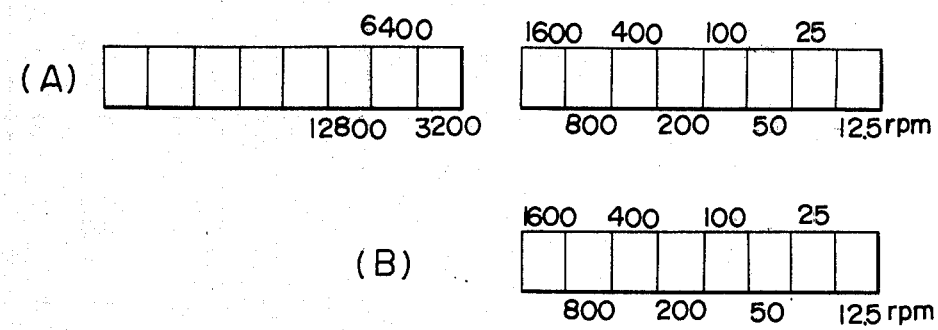
FIG. 6 (A) is an explanatory illustration of a register for holding an actual engine speed.
Figure 7:
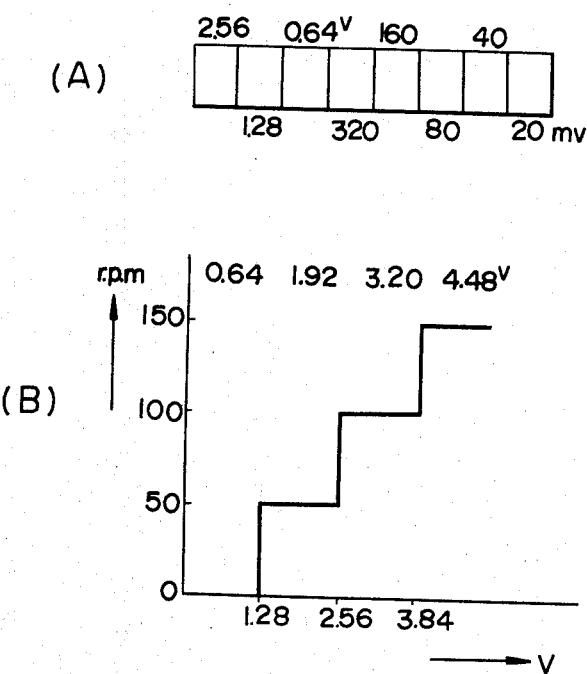
FIG. 7 (A) is an explanatory illustration of a register for holding a value of electric voltage to be applied when the reference engine speed is adjusted manually.

Now we refer to FIGS. 6(A) and (B) and 7(A) and (B), wherein are illustrated methods of storing a value in a register. In a vehicle with the engine speed manually controlled and having no means for feedback control, the engine idling speed can be adjusted manually. For a feedback controlled internal combustion engine, the control value is to be manually corrected by manual adjustment of engine speed. For manual correction, the control system according to the present invention is provided with an external input terminal ISCV. To the external input terminal ISCV is connected a variable resistor which can be manually adjusted. By adjusting the resistance value of the variable resistor, the input voltage is varied in a range from 0 V to 5 V by which the reference engine speed $N_{SET}$ is adjusted. FIG. 6(A) shows a register for holding actual engine speed $N_{RPM}$. The register capacity is two 8-bit bytes, and the engine speed data is stored as a binary number, which represents a multiple of 12.5 r.p.m. FIG. 6(B) shows a register for holding the reference engine speed $N_{SET}$. The register is of eight bits, one byte to store engine speed data with a maximum value of 3187.5 r.p.m. FIG. 7(A) shows a register IVAR for storing an analog-digital converted external input terminal voltage ISCV. The register is of eight bits, one byte of which stores the external input terminal voltage in units of twenty millivolts and maximum about five volts. The relationship between the external input voltage and increasing of engine speed will be observed in FIG. 7(B). As shown in FIG. 7(B), the engine speed $N_{SET}$ is increased in steps of 50 r.p.m. In the example shown, the voltages at the top indicate the average voltages in corresponding increased steps of engine speed. It should be noted that although FIG. 7(B) shows respective specific voltages corresponding to respective increased engine speeds, these may vary somewhat because of errors in analog-digital conversion and unevenness of the variable register. To avoid such problems, in the preferred embodiment of the present invention, the analog-digital converted voltage of the external input terminal, as shown in FIG. 8(A), is ANDed with 1100000 in FIG. 8 (B). The result is AB0000000, as shown in FIG. 8(C). Then, the result, as shown in FIG. 8(C), is shifted right by four bits to make the value 0000AB00, as shown in FIG. 8(D). Since A and B are binary digits, the value shown in FIG. 8(D) is therefore one of 0100, 1000 and 1100. These correspond respectively to 50 r.p.m., 100 and 150 r.p.m. This value is then added to $N_{SET}$.

The following table shows an example assuming that the external input voltage is 3.2 volts and the reference engine speed $N_{SET}$ is 600 r.p.m. and is to be increased by 100 r.p.m. Here, further assume that the value of register IVAR is 2.8 in Example I and 3.2 in Example II.

TABLE III

|  |  | Example I(2.8V) | Example II(3.2V) |
|---|---|---|---|
| IVAR | (1) | 10001100 | 10100000 |
| Constant | (2) | 11000000 | 11000000 |
| (1) and (2) | (3) | 10000000 | 10000000 |
| Shift right by 4 bits | (4) | 00001000 | 00001000 |
| $N_{SET}$ | (5) | 00110000 (600r.p.m.) | 00110000 (600r.p.m.) |
| (4) and (5) | (6) | 00111000 (700r.p.m.) | 00111000 (700r.p.m.) |

Thereby, the logical product of (1) and (2) is not influenced by unevennesses in the setting. Therefore, the increasing of the engine speed $N_{SET}$ can be accurately carried out in units of 50 r.p.m. It will be appreciated, here, as shown in FIG. 8(B), there is an allowable range of variation of measured voltage which can prevent errors in the above mentioned correcting operation.

As mentioned above, in the air flow rate control system according to the present invention, the reference engine speed $N_{SET}$ is determined corresponding to engine coolant temperature which is measured by the coolant temperature sensor 114. In open loop control, control ratio for controlling the ratio of energized period and deenergized period of the actuator 92 is determined corresponding to the coolant temperature. On the other hand, in feedback control, the control ratio is determined corresponding to the actual engine speed $N_{RPM}$ determined with respect to crank angle sensor signal and difference between the actual engine speed $N_{PRM}$ and the reference engine speed.

According to the present invention, in open loop control, the control ratio is determined by open loop ratio and feedback ratio.

In open loop control, there are three different ways for amending the control ratio corresponding to the coolant temperature;

a first method: amended total value of the control ratio value corresponding to the coolant temperature;

a second method: amending only the open loop ratio and not the feedback ratio; and a third method: as in the second method, except that the feedback ratio is also amended, wherein under open loop control, the feedback ratio is amended corresponding to the coolant temperature.

Figure 9:
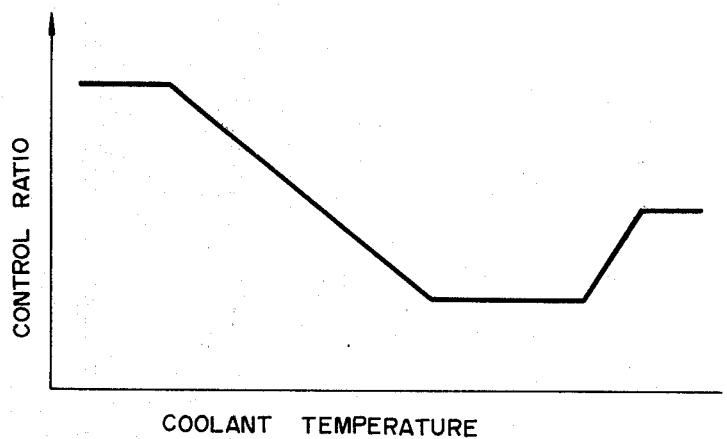
FIG. 9 is a graph showing temperature characteristics of the control signal.

In the first method, a table data determined and preset according to a control characteristics as shown in FIG. 9 is read from the memory unit 104. In practice, the table data is stored in a read-only memory (ROM) included in the memory unit. Corresponding to the coolant temperature sensor signal which is applied to the microcomputer 100 through the analog/digital converter 120, the table data is looked up to determine the control ratio.

Figure 10:
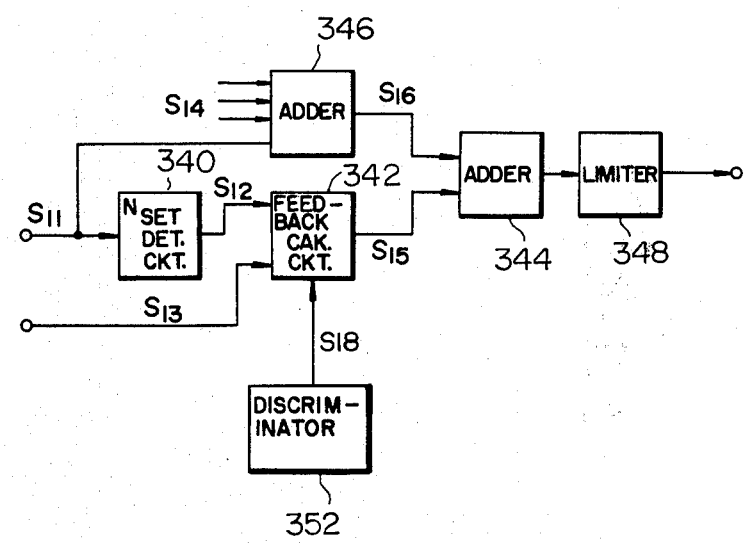
FIG. 10 is a block diagram of an open loop control system according to the preferred embodiment of the present invention.

FIG. 10 shows a block diagram of a device for performing the second method. From the coolant temperature sensor 114, temperature signal $S_{11}$ is applied to a circuit 340 for determining the reference engine speed $N_{SET}$ corresponding to the coolant temperature. The circuit 340 outputs a signal $S_{12}$ indicative of the reference engine speed $N_{SET}$ to a circuit 342 for calculating feedback ratio. To the circuit 342 is applied the crank pulse signal $S_{13}$ indicative of actual engine speed $N_{RPM}$, fed from the crank angle sensor 110. In the circuit 342, the reference engine speed $N_{SET}$ and the actual engine speed $N_{RPM}$ are compared to determine difference $\Delta N$ therebetween. The circuit 342 outputs a feedback signal $S_{15}$ indicative of the feedback ratio corresponding to the diference $\Delta N$ to an adder 344. The coolant temperature sensor signal $S_{11}$ is also applied to a circuit 346 for calculating open loop ratio. To the circuit 346 is also applied a correction signal $S_{14}$ such as acceleration signal and the deceleration signal. The circuit 346 processes the data contained in the inputs to determine the open loop ratio. A signal $S_{16}$ indicative of the open loop ratio is transmitted to the adder 346 from the circuit 346. In the adder 344, the control ratio of both of the signals $S_{15}$ and $S_{16}$ are added. The sum of the control ratio of the signals $S_{15}$ and $S_{16}$ is limited at the upper and lower limit at a circuit 348.

To the feedback ratio calculating circuit 342 is applied an instruction signal $S_{18}$ fed from a discriminator 352. The discriminator 352 processes various inputs indicative of engine condition to decide whether the feedback control is to be carried out. When the discriminator 352 decides the open loop control is to be carried out, the instruction signal $S_{18}$ stores the signal generated at the circuit 342. During application of the signal $S_{18}$, the control ratio calculated in the circuit 342 is maintained in a given fixed ratio. When open loop control is carried out, the open loop control calculating circuit 346 maintains operation for determining the control ratio to generate the signal $S_{16}$ corresponding to the coolant temperature. Therefore, even though the feedback ratio is fixed at a given amount during the open loop control, switching of the control operation from open loop control to feedback control can be performed smoothly so as not to cause delay of response which possibly causes generating exessively high or low control values.

It will be appreciated that the above-mentioned circuit is included in the microcomputer and operation of the circuits will be carried out by the same. Further, although not described in detail, in the third method the feedback ratio corresponds to the coolant temperature. At this time, the feedback ratio is varied independently of the difference between the actual engine speed $N_{RPM}$ and the reference engine speed $N_{SET}$.

As in the above-mentioned system in which open loop control and feedback control are alternatively carried out, idle engine speed can be accurately and successfully controlled even when the vehicle is driven under cold engine condition without warming up, by corresponding at least the open loop ratio to the coolant temperature. As shown in FIG. 9, idle control valve means can follow an engine operating condition (coolant temperature) and is prevented from becoming excessively high or low upon entering idling. As shown in FIG. 9, the control ratio is relatively high depending on high temperature range to increase the idle engine speed to increase velocity of coolant flowing through the coolant chamber and also increase the speed of the radiator fan to increase amount of radiating air so as to cool the engine temperature effectively.

With respect to correction after starting the engine and particularly immediately after starting the engine, the engine condition is different from that after relatively long idling even if the coolant temperature is the same. This will depend on differences of lubricant oil condition, friction of each element of engine and so on. For example, comparing the engine conditions warmed up by 20° C. from a substantially cold engine condition and starting at the same coolant temperature, engine load is higher in the latter than the former. Further, upon starting the engine, the engine temperature is varied in the various portions thereof and does not always correspond to the coolant temperature. Actually, immediately after starting the engine, the portions of engine cylinder adjacent to the combustion chambers are heated faster than the remainder. On the other hand, as mentioned above, since the reference engine speed $N_{SET}$ is determined corresponding to the coolant temperature, the determined reference engine speed upon starting with relatively high coolant temperature is somewhat lower than that required due to heavy load subjected thereto. This will possibly cause instability of engine speed to result in engine stall.

For preventing this, according to the present invention, the reference speed is increased at a given rate within a given period of time from starting the engine. In practice, a predetermined reference engine speed and maintenance time respectively corresponding to the coolant temperature are stored in a ROM of the memory unit 104 of FIG. 1, as table data. Upon starting the engine, for example, when turning the starter switch on position is detected, the table data is looked up to determine the correction rate for the reference engine speed.

It should be noted that the rate for increasing the reference engine speed and period for maintaining the increased reference engine speed can be calculated with a formula corresponding to required engine operation at starting. However, the formula will be quite complicated so as not to exactly follow the variation of engine conditions and not to fulfill the starting engine requirements completely.

Figure 11:
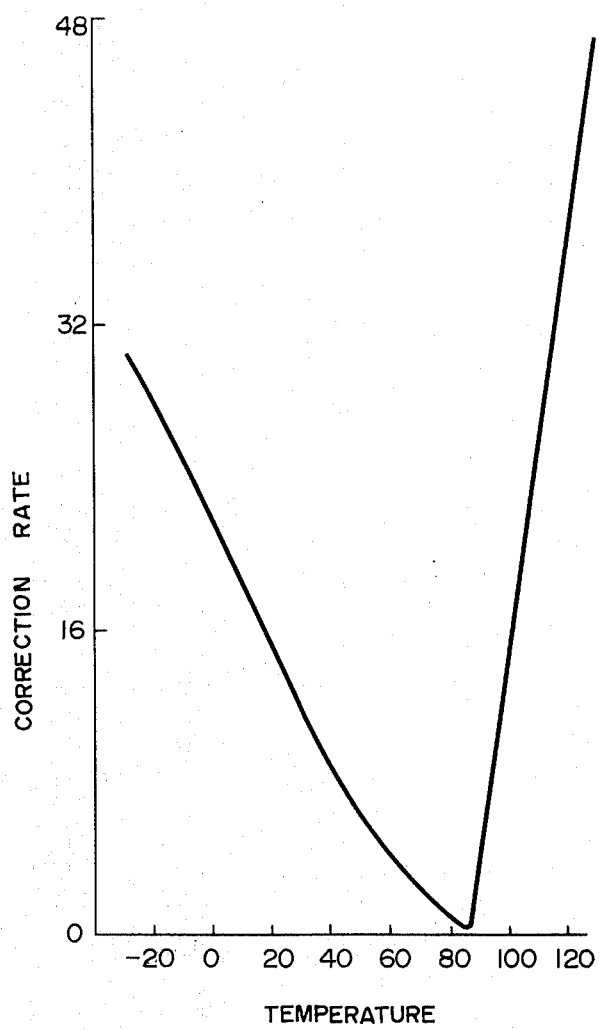
FIG. 11 is a graph showing characteristics of initial value of correction responsive to engine starting.

It will also be possible to determine only the first correction value for increasing the reference engine speed at the engine which correction value is determined according to the control characteristics as shown in shown in FIG. 11. According to this method, the first correction rate will be determined corresponding to the coolant temperature upon engine starting. After starting the engine and therefor after once determining the correction rate, the correction rate is decreased at a given rate and a given timing.

According to this method, it is possible to make correction of the reference engine speed within a period of time proportional to the first determined correction rate. This can reduce the capacity of the ROM to be used for correction upon the engine starting.

It will be appreciated that, since the fuel control system should be also corrected to control the fuel supply rate at the engine starting, it is posible to use the correction value determined as above-mentioned in common.

Thus, even if the vehicle is driven under the cold engine condition and thereafter enters into idling, the engine speed can be accurately controlled. Further, upon engine starting, the engine speed is kept stable by correction of the control ratio corresponding to difference of engine load. This results in increased drivability and reduced pollution caused by engine exhaust gas.

The control ratio upon engine starting, determined as above, is corrected corresponding to kind of transmission, i.e., manual type or automatic type, transmission gear position, i.e. either driving range or neutral range, and air conditioner operating position. At the same time, the minimum rate of the control ratio is also determined. The following table shows correction ratio, control ratio and the minimum duty cycle with respect to various engine position.

TABLE

|  | Air Conditioner | Transmission Position | Correction rate (%) | Minimum rate (%) |
|---|---|---|---|---|
| Manual Transmission | OFF |  | 0 | 25 |
|  | ON |  | 5 | 30 |
| Automatic Transmission | OFF | Neutral | 0 | 25 |
|  | " | Drive | 1.5 | 25 |
|  | ON | Neutral | 9 | 32.5 |
|  | " | Drive | 10.5 | 34 |

As observed in the above TABLE, when the air conditioner is turned off and the transmission is in neutral range, the correction ratio and minimum rate are the same corresponding to both manual transmission and automatic transmission. In the other cases, the correction ratio and the minimum rate are varied corresponding to each combination of operating conditions to acurately control the engine speed as required. By determining the minimum rate, irregular revolution of engine and instability of engine speed is satisfactorily prevented.

Figure 12:
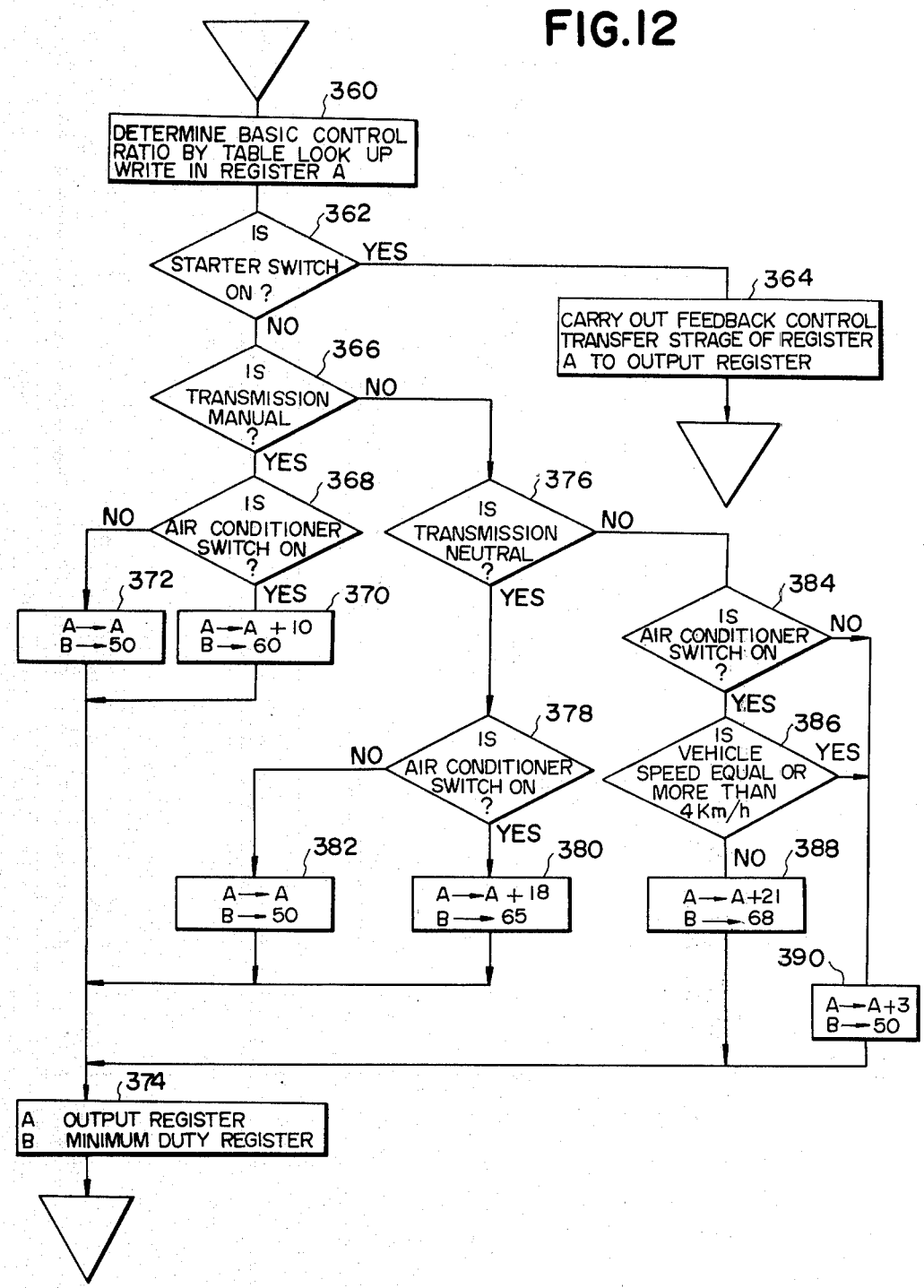
FIG. 12 is a flowchart of a program for correcting control ratio corresponding to difference of engine load.

FIG. 12 shows a flowchart of a program for processing the above mentioned correction for engine starting. It should be noted the program will be executed once per cycle of engine revolution. Further, it should be appreciated that this program is executed in sequence to the program for determining the basic reference engine speed. The basic control output corresponding to reference engine speed $N_{SET}$ is determined based on the coolant temperature by way of table look up at a block 360. At the block 360, the determined basic control ratio is written in an register A. Thereafter, the starter switch position is checked at a decision block 362. If the starter switch is on position, a feedback flag is in an set so as to carry out feedback control immediately after starting at a block 364. At the block 364, the basic control ratio stored in the register A is transferred to an output register. When the starter switch is in an off position, the kind of the transmission is checked at a decision block 366. When the transmission is off the manual type, an air conditioner switch is checked at a decision block 368. If the air conditioner switch is on, the basic control ratio stored in the register A is incremented by 10 which corresponds to 5% of pulse duty applied to the actuator 92 and stored again in the register A at a block 370. At the same time, value 60 as a minimum output ratio which corresponds to 30% of pulse duty of control signal is stored in a register B at the block 370. Likewise, if the air conditioner switch is formed off, the value 50 as the minimum ratio corresponding to 25% of pulse of control signal is stored in the register B at a block 372. At this time, the control output stored in the register A is not corrected. After processing of the control output and determining the minimum control ratio, at the blocks 370 and 372, the control output is transfered to the output register at a block 374. At the block 374, the minimum control ratio stored in the register B is also transfered to a minimum control ratio register.

When a decision is made that the transmission is of an automatic type, at the decision block 366, the position of the transmission is checked whether the transmission is in the neutral gear position at a decision block 376. If the decision at the block 376 is YES, the air conditioner switch is checked at a decision block 378. When the air conditioner switch is on, the control output stored in the register A is incremented by 18 which corresponds to a 9% a pulse duty cycle of the control signal at a block 380. At the same time, the minimum ratio is set in the register B at 65 corresponding to 32.5% of pulse duty cycle at the block 380. If the air conditioner switch turns off, the minimum value is set in the register B at a value 50 corresponding to a 25% pulse duty cycle, at a block 382. At this time, the control output is not corrected.

If the decision at the block 376 is NO, the air conditioner switch is checked at a decision block 384 to determine whether the switch is on. If the decision is YES, the vehicle speed is checked at a decision block 386 to determine whether the speed is equal to or more than 4 km/h. If the decision of the block 386 is NO, the control output is incremented by 21 corresponding to a 10.5% pulse duty cycle, at a block 388. At the block 388, the minimum value is set in the register B at 68 corresponding to a 34% pulse duty cycle. When the decision of the block 384 is NO or the decision of the block 386 is YES, the control output is incremented by 3 corresponding to a 1.5% pulse duty cycle, at a block 390. At the same time, the minimum value in the register B is set to 50 corresponding to a 25% pulse duty cycle.

After processing of blocks 380, 382, 388 or 390, the control output is transfered to the output register and the minimum value is transfered to the minimum duty register, at the block 374.

It will be appreciated, the decision block 386 is provided for restricting the of pulse duty cycle of the control signal, since when the vehicle speed is relatively high, the engine speed becomes correspondingly higher than that which would possibly cause engine stall or would be required for driving and operating the air conditioner. However, the block 386 is not always necessary for determining the pulse duty cycle of the control for controlling idle engine speed at starting. Even if the block 386 is omitted, it will merely cause slight discomfort due to change of engine load corresponding to switching on and off of the air conditioner.

According to the above-mentioned program, the control output open loop control is accurately and satisfactorily made to correspond to engine load condition make it easy to control other operations following this. Further, by determining the minimum pulse duty cycle corresponding to the engine load condition, even when the engine speed is rapidly decreased, excessive control signal duty cycle pulses will not be applied to the valve means, and thereby, the engine can be prevented from stalling.

It will be appreciated that, according to the present invention, the control output does not have to be changed corresponding to manual transmission gear positions. On the other hand, in automatic transmissions, the control output is varied corresponding to drive or neutral gear positions thereof, since the engine load is varied corresponding thereto.

Meanwhile, when the voltage of the vehicle battery drops, it is necessary to recharge the battery. For rapidly recharging the vehicle battery, it will be preferable to temporarily increase engine idling speed. Actually, when the battery voltage drops below 12 volts, the engine idling speed is incremented. It will be preferable to increment the engine idling speed when the battery voltage stays below 12 volts for a given period. FIG. 5 shows a flowchart of a program to be executed in response to a drop in the battery voltage.

Figure 13:
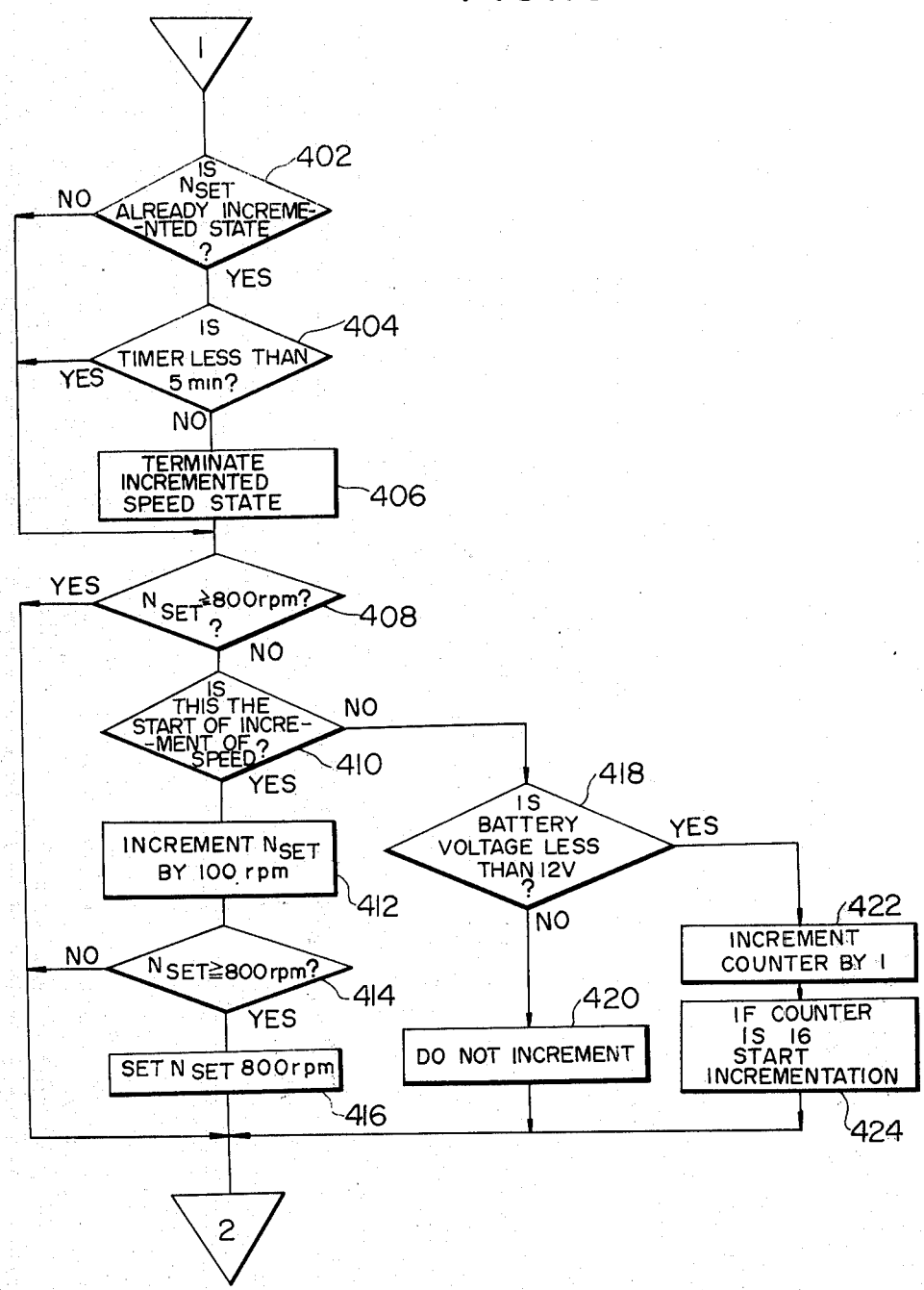
FIG. 13 is a flowchart of a program for correcting the reference engine speed in response to a drop in the vehicle battery voltage.

Referring to FIG. 13, there is shown a flowchart of a program for incrementing the engine speed in response to a drop in battery voltage. In the embodiment shown, the program is executed to increment the engine idling speed when the battery voltage stays below 12 volts for six executions of the program. When the idling engine speed is incremented, the reference engine speed $N_{SET}$ is increased by steps of 100 r.p.m. in a range not to exceed 800 r.p.m. For convenience of following explanation and for a better understanding of the description, explanation is begun at a decision block 418 which checks whether the battery voltage is more than 12 volts. When the battery voltage is more than 12 volts, an instruction not to increment the engine speed is made in a processing block 420. If the battery voltage is less than 12 volts, a counter is incremented by one in a processing block 422. The counter value is checked as to whether it is 16, and when the counter value becomes 16 an instruction to increment the reference engine speed $N_{SET}$ is issued in processing block 424. After the increment instruction is issued, it is preferable to reset the value of the counter to zero. When the increment instruction is issued, the engine speed is checked in a decision block 402 as to whether it has already been increased. If not, a timer starts to measure the time interval at the same time the engine idling speed begins to be increased and control jumps to a decision block 408. When the engine speed is increased and the decision of the decision block 402 is YES, at a decision block 404, the time interval measured by the timer is checked to determine whether increased engine idling speed has been maintained for a given period of time, for example, five minutes. If not, the process jumps to a decision block 308. In the decision block 408, the reference engine speed $N_{SET}$ which is stored in register A, is checked to determine whether it exceeds 800 r.p.m.

Since it is unnecessary to increase the engine speed when the reference engine speed $N_{SET}$ exceeds 800 r.p.m., if the decision of the decision step 408 is YES, the process jumps to end. When the decision of the decision block 408 is NO, then the reference engine speed $N_{SET}$ stored in register A is increased by 100 r.p.m. in a processing block 412. The increased engine speed $N_{SET}$ is checked in a decision block 414 as to whether it exceeds 800 r.p.m. If the increased engine speed $N_{SET}$ exceeds 800 r.p.m., the engine speed $N_{SET}$ is corrected to 800 r.p.m. in a processing block 416. On the other hand, when the increased engine speed $N_{SET}$ is less than 800 r.p.m., the process jumps to end. Meanwhile, if at both the block 404 and the block 414, the decisions are YES, i.e., increased engine speed has been maintained for more than five minutes, in a process block 406, the increment of engine idling speed is ended, to return to the previously set reference speed. Further, if the engine speed $N_{SET}$ is already increased at the decision block 410, the process jumps to a decision block 418 to check the battery voltage.

By the above-mentioned program to be executed in response to a drop in battery voltage, the acceleration of engine idling speed is carried out when the battery voltage is maintained for a given period of time. Thereby, if the battery voltage drops momentarily, the engine idling speed is not incremented so as not to respond to such a temporary voltage drop which may be caused by operating vehicle devices. Further, since the program limits the maximum engine idling speed to 800 r.p.m., the vehicle is effectively prevented from creeping.

The reference engine speed should be corrected correspondingly to a load applied to the engine so as to accurately adapt the engine speed to that required. There are various factors to vary the load applied to the engine, such as kind of transmission, transmission gear position, and operating condition of an air conditioner. With respect to corrected reference engine speed, the duty cycle of the pulse signal to be applied to the actuator 92 is determined.

However, in the present control system, two different control operations, i.e. feedback control and open loop control, are carried out selectively. Feedback control should be carried out under stable engine driving conditions, since, in this control operation, the control signal is determined corresponding to the actual engine speed and the difference between the reference engine speed and the actual engine speed. If feedback control is used under unstable engine driving conditions, in which the actual engine speed is frequently varied, the control signal is unnecessarily varied to possibly cause the engine to stall, and increase the harmful components in the exhaust gas. For determining stable engine driving conditions suitable for feedback control, various engine control parameters will be checked.

Now we explain discrimination for selectively carrying out feedback and open loop control operations. The discriminating operation is carried out by the microcomputer 100. Basically, feedback control is used when the throttle valve is entirely closed, in other words, when the throttle valve angle sensor 122 of FIG. 1 is turned ON (hereinafter referred as FACTOR I). Additionally, it is necessary to carry out feedback control when the engine is stably driven. Therefore, for discriminating whether the vehicle condition is adapted to allow feedback control, a combination of various factors should be adapted to specific conditions therefor. For determining a feedback control condition, the throttle valve angle sensor 122 signal, neutral safety switch 128 signal of a power transmission, and vehicle speed switch 130 signal are checked. Additionally, whether a clutch position switch is turned ON, corresponding to the clutch being disengaged is checked. Further, the presence of a fuel cut off signal generated by the fuel supply system is checked.

If the neutral safety switch 128 is turned ON which indicates that the transmission is in neutral, no load is applied to the engine. This (hereinafter referred as FACTOR II) is adapted to carry out feedback control.

When the vehicle speed is less than a given speed, e.g., 8 km/h, the vehicle speed switch turns ON. In this condition (hereinafter referred to as FACTOR III), a load may be applied to the engine but the vehicle speed is substantially low. In this condition, the feedback control can also take place.

When the clutch position switch is turned ON (hereinafter referred to as FACTOR V), similar to FACTOR II, the feedback control can take place.

If the fuel supply system is in the fuel shut off position, this generally means that the vehicle is being decelerated. When the vehicle is being decelerated, feedback control can not be carried out. Therefore, to carry out feedback control, the fuel supply system should not be in the fuel shut off position (hereinafter referred as FACTOR VI).

Even after some combinations of the factors adapted to feedback control are set, a time delay is required to stabilize the engine condition. For avoiding errors in control, particularly upon changing from open loop to feedback control, it is required that the engine be stable. For example, when the vehicle is being decelerated, the engine is driven by the vehicle action, that is, engine-braking, the engine speed is lowered excessively to cause instability for a period of time. Further, for example, after the engine speed is increased to a substantially high speed without applying a load, it also takes a time to return to stable conditions. Therefore, in the preferred embodiment of the present invention is provided a transient delay time to enter into feedback control. For example, the transient delay time may be 4 seconds from the other factors adapted to feedback control. After expiration of the transient delay time (hereinafter referred as FACTOR IV), feedback control is carried out.

With respect to discrimination of the vehicle conditions for carrying out feedback control, there are various combinations to be checked, such as:
(a) FACTOR I AND (FACTOR II OR FACTOR III) AND FACTOR IV
(b) FACTOR I AND (FACTOR II OR FACTOR V) AND FACTOR IV
(c) FACTOR I AND (FACTOR II OR FACTOR III) AND FACTOR VI It will be understood that throughout this specification, in such contexts as this, the word "OR" will be given its inclusive meaning, that is to say will not exclude both conditions from holding.

In combination (a), when the throttle valve is entirely closed, the transmission is in neutral position or the vehicle speed is less than 8 km/h, and the transient delay time expires, feedback control is carried out. In combination (b), FACTOR III of combination (a) is replaced by FACTOR V. Since FACTOR III and FACTOR V are similar at least in so far as the engine is not in engine-braking position, conditions (a) and (b) are similar. It should be noted that FACTOR II is also the same kind of factor being capable of substitution for the FACTOR III and FACTOR V. Therefore, although not listed specifically here, various combinations adapted for determination of vehicle conditions will be apparent to those skilled in the art.

In combination (c), FACTOR IV is replaced by FACTOR VI. Since the FACTOR VI indicates that the fuel supply is not shut off, namely the FACTOR VI indicates the vehicle is not decelerated, the engine can be regarded as stable by combination with other factors.

Alternatively, when the engine control is changed from feedback control to open loop control, it is of course possible to discriminate the condition by discriminating one or more factors not adapted to perform feedback control. However, in practice, when the control changes from feedback to open loop, first FACTOR I will change so as not to be adapted to feedback control and the remaining factors will be changed following the change in FACTOR I. Therefore, indeed, it is possible to detect the engine condition to change control from the feedback to the open loop by merely determining that FACTOR I is not satisfied.

Figure 14:
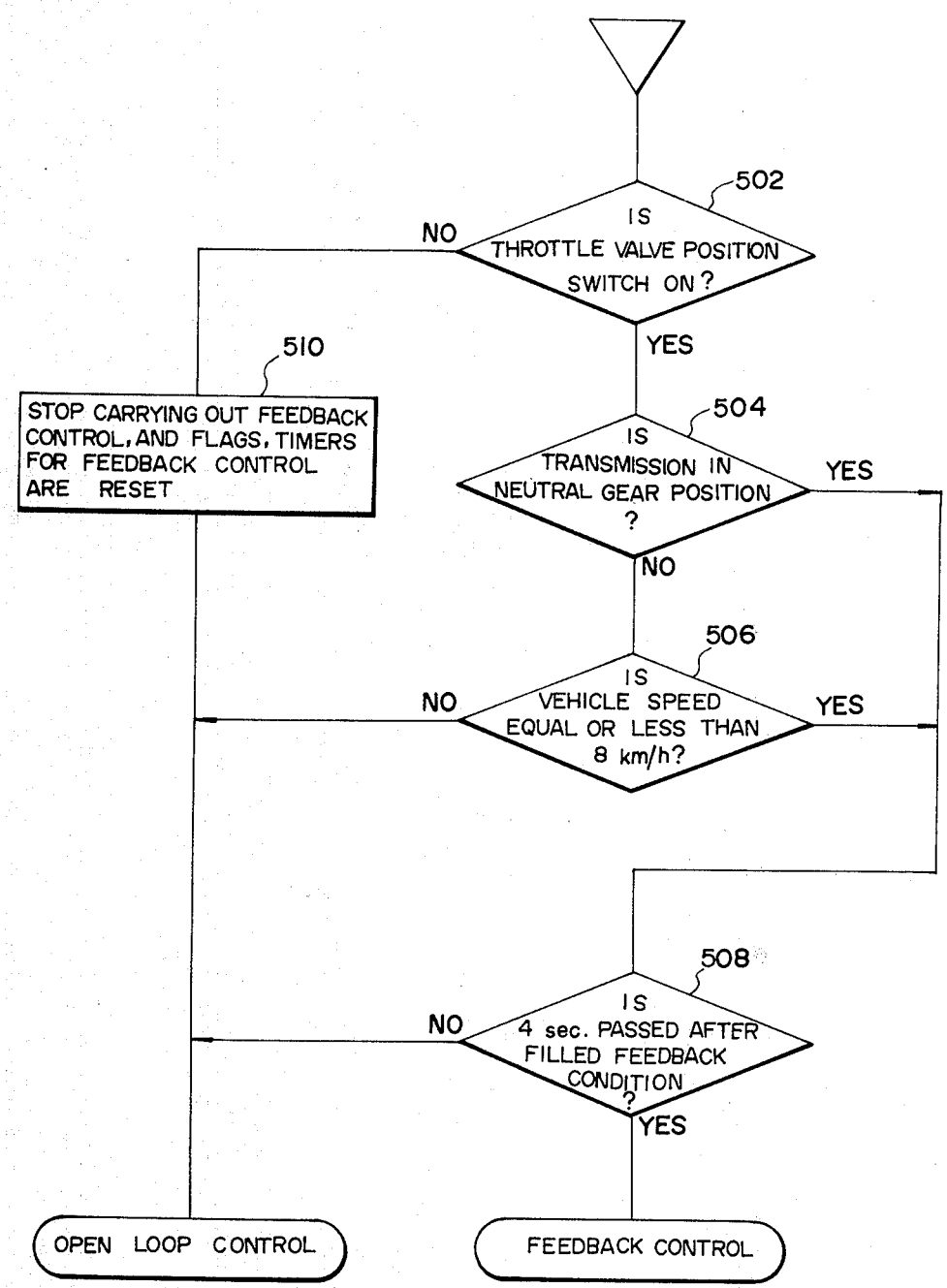
FIG. 14 is a flowchart of a program for discriminating the engine driving condition according to a first embodiment of the present invention, wherein the throttle valve switch, transmission gear position, vehicle speed and transient delay time are used as factor for discriminating the condition.
Figure 15:
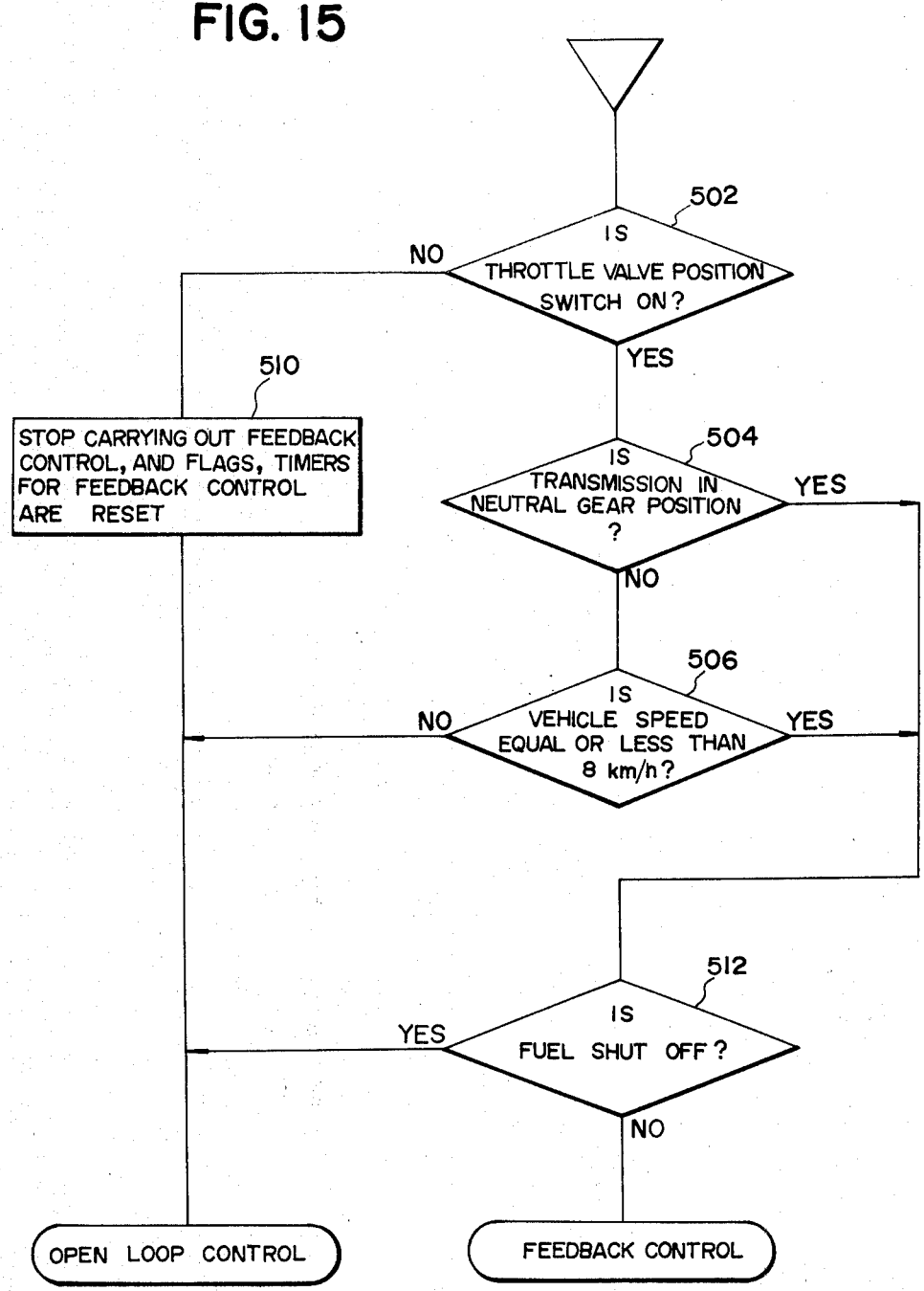
FIG. 15 is a flowchart of a modified program of FIG. 14, wherein the transient delay time as the discriminating factor is replaced by a fuel supply condition.

Referring now to FIGS. 14 and 15, there are illustrated flowcharts of programs for discriminating the engine condition. FIG. 14 shows a program for checking the foregoing combination (a) and FIG. 15 shows a program for checking the combination (c).

In FIG. 14, the program may be executed for each cycle of engine revolution, for example. After determining a reference engine speed with respect to various control parameters, such as the coolant temperature, crank angle signal, neutral position, the vehicle condition is checked with respect to factors I to VI. Upon execution of the program, first, the throttle valve angle sensor signal is checked to detect the entirely closed position of the throttle, in a decision block 502. When the decision at the block 502 is YES, whether the transmission is in neutral is checked, in a decision block 504. If the decision in block 504 is YES, then whether a given transient delay time has expired is checked, in a decision block 508. If the decision in the block 504 is NO, then whether the vehicle speed is less than 8 km/h is checked, in a decision block 506. If the decision in the block 506 is YES, then the operation also skips to the block 508 to check expiration of the given transient delay time. When the decision in the block 508 is YES, then feedback control is started.

If the decision in the block 502 is NO, then feedback control is stopped and all the flags and timers for use with feedback control are reset in a block 510. If the decision of the block 506 or 508 is NO or after operation of the block 510, open loop control is carried out. It will be understood from FIG. 14 that when the transmission is in neutral, the vehicle is naturally stationary. Therefore, when the block 504 decides YES, it is unnecessary to check the vehicle speed.

In the above-mentioned program, feedback control will be performed under the following condition:
FACTOR I AND (FACTOR II OR FACTOR III) AND FACTOR IV.

Now referring to FIG. 15, there is illustrated another program for discriminating the engine condition, wherein the block 508 in FIG. 3 is replaced by a block 512, which determines whether the fuel supply is shut off. The remainder is substantially the same as illustrated and explained with respect to FIG. 14, and therefore it is unnecessary to explain further here.

In the program shown in FIG. 15 the engine condition is discriminated, and when the combination (c) is satisfied, feedback control is performed.

It will be understood that there are various ways of discriminating engine condition. Therefore, the specific embodiments as mentioned with reference to FIGS. 14 and 15 are merely embodiments and it will be possible to embody otherwise. Hereinafter illustrated is a modification of the method for discriminating the engine condition.

In the modified embodiment, in addition to FACTOR I to FACTOR VI, the following factors are checked for discrimination of engine condition:

FACTOR VII: the actual engine speed $N_{RPM}$ is less than the reference engine speed $N_{SET}$, i.e. $\Delta N < 0$ ($\Delta N = N_{RPM} - N_{SET}$);

FACTOR VIII: the actual engine speed $N_{RPM}$ is more than the reference engine speed $N_{SET}$, i.e. $\Delta N > 0$;

FACTOR IX: the difference $\Delta N$ between the actual engine speed $N_{RPM}$ and the reference engine speed $N_{SET}$ is less than a given negaive value, for example, $-25$ r.p.m.;

FACTOR X: the difference $\Delta N$ between the actual engine speed $N_{RPM}$ and the reference engine speed $N_{SET}$ is more than a given value, for example, 25 r.p.m.; and FACTOR XI: actual intake air flow rate Q is less than a given minimum rate $Q_{min}$.

Further, the FACTOR IV is divided into two different factors, such as:

FACTOR IV-1: after the feedback condition is satisfied, a first given time; for example, 1 second, has elapsed; and FACTOR IV-2: after the feedback condition is satisfied, a second given time which is longer than the first given time, e.g. 4 seconds, has elapsed.

FACTORs IV-1 and IV-2 will be selectively checked corresponding to other factors for the engine condition. FACTORs VII and VIII indicate opposite conditions respectively indicating control requirements of increasing and decreasing the actual engine speed $N_{RPM}$ to match the same to the reference engine speed $N_{SET}$. With respect to these factors, the different discriminating operations will be carried out and the required engine condition is varied. As an explanation, compare the following two cases.

(A) FACTOR I AND FACTOR VII
(B) (FACTOR I AND FACTOR IV-2) AND {(FACTOR II OR FACTOR III) AND FACTOR IV-1} AND FACTOR VIII.

In the above conditions, (A) is a case where the engine speed is to be increased and (B) is a case where the engine speed is to be decreased. Feedback control will be carried out on expiration of the time delays given by FACTOR IV-2 and FACTOR IV-1 after FACTOR I and FACTOR II or FACTOR III are respectively satisfied and when FACTOR VIII is satisfied. FACTORS IV-1 and IV-2 are given delay times for decreasing the engine speed. Namely, when the engine speed is to be increased i.e. the difference $\Delta N$ is negative, feedback control is carried out very shortly after the throttle valve is entirely closed. On the other hand, the feedback control will be carried out, when all the following conditions are fulfilled:

first: the throttle valve is entirely closed;
second: after the throttle valve is closed, a 4-second time delay expires;
third: the transmission is in neutral position or the vehicle speed is less than 8 km/h;

fourth: after the third condition is fulfilled, a 1-second time delay expires; and fifth: the actual engine speed $N_{RPM}$ is more than the reference engine speed $N_{SET}$.

When it is required to increase the engine speed, i.e., the actual engine speed $N_{RPM}$ is less than the reference engine speed $N_{SET}$, the engine may stall because of a lack of engine speed, and therefore it is necessary to increase the engine speed rapidly. Further, there is no danger in rapidly increasing the engine speed. Therefore, it is possible to carry out feedback control immediately after the combination (A) is fulfilled. On the other hand, when the engine speed is required to be decreased, i.e., the actual engine speed $N_{RPM}$ is more than the reference engine speed $N_{RPM}$, a rapid decrease of engine speed may cause the engine to stall. Therefore, in this case, the time delay is required for safety.

In combination (A), FACTOR VII can be replaced by FACTOR XI, i.e., the combination (A) can be replaced by FACTOR I AND (FACTOR VII OR FACTOR XI) . . . (C). Meanwhile, the combination (B) can be replaced any one of the following:

(D) {[(FACTOR I AND (FACTOR II OR FACTOR V)] AND FACTOR IV-1} AND FACTOR VIII (E) {FACTOR I AND (FACTOR II OR FACTOR III) AND FACTOR VIII} AND FACTOR IV-1; and (F) FACTOR I AND (FACTOR II OR FACTOR III) AND FACTOR VIII AND FACTOR VI.

In combination (C), feedback control is carried out when the throttle valve is entirely closed and the actual engine speed $N_{RPM}$ is less than the reference engine speed $N_{SET}$ or the intake air flow rate Q is less than the given minimum rate $Q_{min}$. In combination (D), the feedback control is carried out when the following conditions are fulfilled:

first: the throttle valve is entirely closed, and the transmission is in neutral position or the clutch-switch is turned on;

second: after fullfilling the first condition, a 1 second time delay elapses; and third: the actual engine speed $N_{RPM}$ is more than the reference engine speed $N_{SET}$.

In combination (E), feedback control is carried out when the following conditions are fulfilled:

first: the throttle valve is entirely closed, the actual engine speed $N_{RPM}$ is more than the reference engine speed $N_{SET}$, and, the transmission is in neutral position or the vehicle speed is less than 8 km/h; and second: a 1-second delay time expires.

In the combination (F), feedback control takes place when the following conditions are fulfilled:

the throttle valve is entirely closed;

the transmission is in neutral position or the vehicle speed is less than 8 km/h;

the actual engine speed $N_{RPM}$ is more than the reference engine speed $N_{SET}$; and the fuel supply is not shut off.

In the meanwhile, when the engine is idling, the engine speed frequently varies within a relatively small difference with respect to the reference engine speed. In this condition, even though the actual engine speed $N_{RPM}$ is slightly different from the reference engine speed $N_{SET}$, the engine can be regarded as correctly controlled. In this case, it is unnecessary to control the actual engine speed corresponding to the reference engine speed by feedback control. If the control operation follows such a small difference between the actual engine speed and the reference engine speed, the control signal will be frequently varied according to changes of the actual engine speed so as to perform unnecessary and not so effective control. Therefore, it is preferable to allow a certain range of the actual engine speed within which corrections are not made, to provide a hysteresis effect. In the shown embodiment, a dead band of, for example, 25 r.p.m. is defined 25 r.p.m. on either side of the reference engine speed $N_{SET}$. The FACTORS IX and X are, therefore, provided so as to determine whether the actual engine speed is in the dead band. According to the above consideration, there are provided for example the following twelve combinations:

(A) FACTOR I AND FACTOR VII;

(A') FACTOR I AND FACTOR IX;

(B) FACTOR IA AND FACTOR IV-2 AND {(FACTOR II OR FACTOR III) AND FACTOR IV-1} AND FACTOR VIII;

(B') FACTOR I AND FACTOR IV-2 AND {(FACTOR II OR FACTOR III) AND FACTOR IV-1} AND FACTOR X;

(C) FACTOR I AND (FACTOR VII OR FACTOR XI);

(C') FACTOR I AND (FACTOR IX OR FACTOR XI);

(D) {[(FACTOR I AND (FACTOR II OR FACTOR V) ] AND FACTOR IV-1} AND FACTOR VIII;

(D') {[FACTOR I AND (FACTOR II OR FACTOR V)] AND FACTOR IV-1} AND FACTOR X;

(E) {FACTOR I AND (FACTOR II OR FACTOR III) AND FACTOR VIII} AND FACTOR IV-1;

(E') {FACTOR I AND (FACTOR II OR FACTOR III) AND FACTOR X} AND FACTOR IV-1;

(F) FACTOR I AND (FACTOR II OR FACTOR III) AND FACTOR VIII AND FACTOR VI; and (F') FACTOR I AND (FACTOR II AND FACTOR III) AND FACTOR X AND FACTOR VI.

In the above combinations, the combinations (A), (A'), (C) and (C') correspond to cases where the engine speed is to be increased and the remainder correspond to cases where the engine speed is to be decreased. It will be noted that in the above-mentioned combinations, the FACTORS II, III and V are substantially similar factors indicative of at least the engine not being in the engine braking state. Therefore, any one of the factors can be checked for determining the feedback condition.

As above, when the engine control is changed from the feedback control to open loop control, it is of course possible to discriminate the condition by discriminating one or more factors not being adapted to perform feedback control. However, in practice, when the control changes from feedback to open loop, first FACTOR I will change so as not to be adapted to feedback control and the remainder will change following the change in FACTOR I. Therefore, indeed, it is possible to detect the engine condition to be controlled by open loop by merely discriminating the FACTOR I not being satisfied. If necessary, FACTOR III may be checked in addition to FACTOR I so as to check if the vehicle is moving by inertia and so on without application of the accelerator.

In open loop control, the minimum value of the reference speed is restricted to a relatively high value to prevent the possibility of stalling. Therefore when control changes from feedback to open loop, the speed setting of the engine may rise suddenly. To prevent this, when the control is changed from feedback control to open loop control and when the control value in the feedback control is less than the minimum value for open loop control, the control value is increased only gradually at a given rate and a given timing, for example, increasing 0.5% for 128 cycles of engine revolution.

Figure 16:
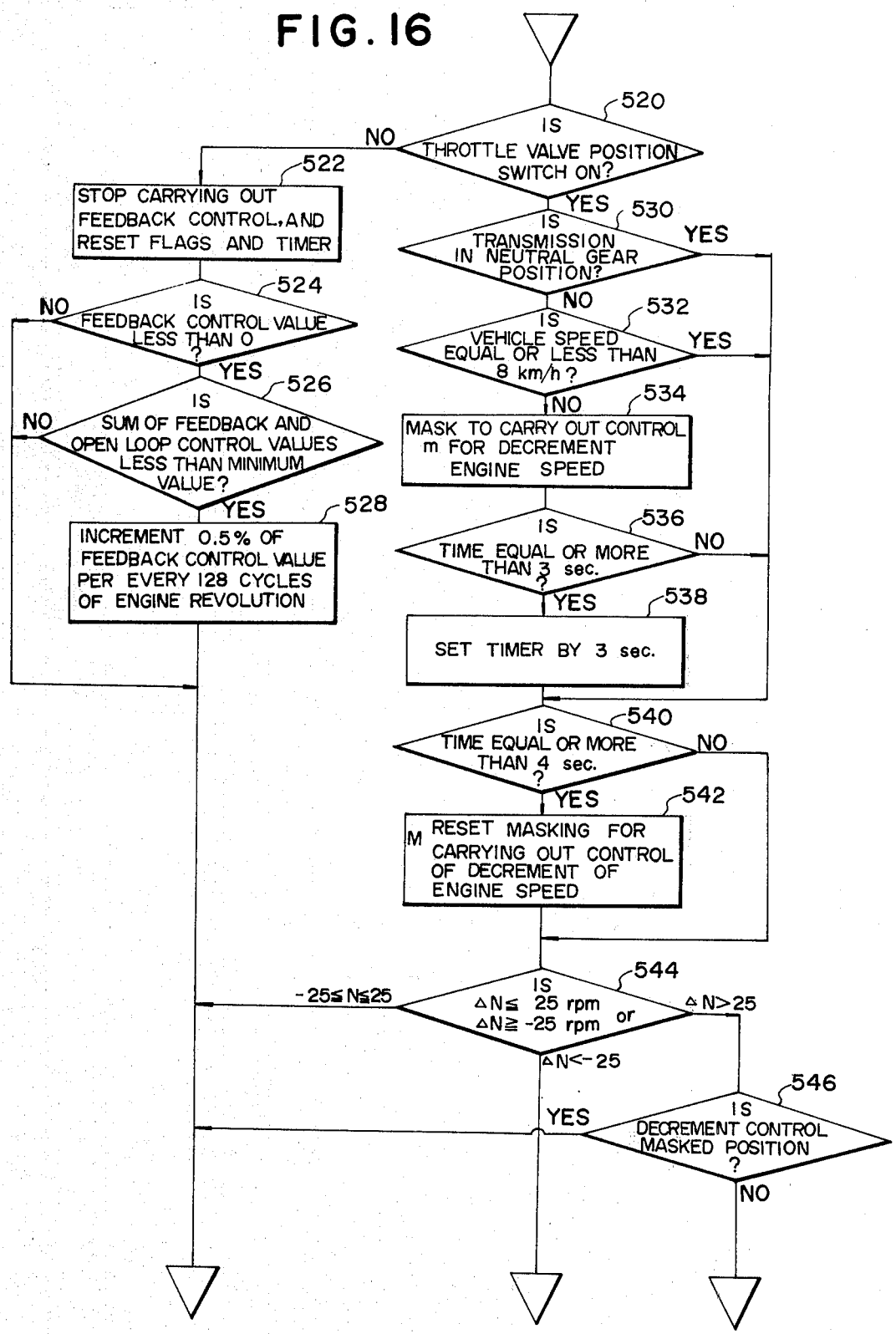
FIG. 16 is a flowchart of a program for discriminating the engine driving condition and thereby for carrying out feedback control and open loop control selectively according to a second embodiment of the present invention, wherein a dead band of control operation is defined with respect to a difference between an actual engine speed and the reference engine speed.

In FIG. 16 is illustrated a flowchart of a program according to another embodiment of the present invention to operate the above-mentioned discrimination of the feedback control condition. In FIG. 16, as in the programs shown in FIGS. 14 and 15, this program is executed once per cycle of engine revolution. At first, the throttle valve position is checked with respect to the throttle valve angle sensor signal, in a decision block 520. When the throttle valve is not in an entirely closed position and therefore the throttle valve position switch turns off, the feedback control is stopped in a block 522. Then, in block 522, flags and timers for use with the feedback control operation are cleared. Thereafter, the final control value determined by the feedback control operation is checked to determine whether the control value is to decrease the actual engine speed $N_{RPM}$, in a decision block 524. If the decision of the block 524 is YES, then the sum of the control values by the feedback control and the open loop control is checked to determine whether it is less than the minimum value, in a decision block 526. If the decision of the block 526 is YES, the control value is increased by 0.5% per 128 cycles of the engine revolution, in a block 310. Blocks 526 and 528 are provided to prevent the control value from increasing too much when the control is switched from the feedback control to the open loop control. After the operation of block 528, or if the decision of either one of the blocks 524 or 526 is NO, then the open loop control is started.

On the other hand, if the throttle valve is entirely closed and thereby the throttle valve position sensor turns ON, and, therefore, the decision of the block 520 is YES, the transmission gear position is checked to determine whether it is in neutral range, in a decision block 530. If the decision of the block 312 is NO, the vehicle speed is checked to determine whether it is equal to or less than 8 km/h, at a decision block 532. If the vehicle speed is more than 8 km/h and, therefore, the decision of the block 532 is NO, control operation decreasing the actual engine speed $N_{RPM}$ is masked at a block 534. When the decreasing control is masked, a time measured by a timer which measures transient delay time, is checked to determine whether it is equal to or more than 3 seconds, at a decision block 536. When the time exceeds 3 seconds, the timer is set to 3 seconds at a block 538. Thereafter, the time of the timer is checked again, to determine whether it is equal to or more than 4 seconds, in a decision block 540. If the decision of the block 540 is YES, the masking of control operation for decreasing the engine speed is reset in a block 542. Then, the difference $\Delta N$ of the actual engine speed $N_{RPM}$ and the reference engine speed $N_{SET}$ is checked in a decision block 544.

When the decision of either of the blocks 530 and 532 is YES, control jumps to the decision block 540. Likewise, if the decision of the block 536 is NO, control also jumps to the block 540. When the decision of the block 540 is NO, control jumps to the block 326. In the decision block 544, the difference $\Delta N$ is checked after "checked" whether it is equal to or more than 25 r.p.m. and also whether it is equal to or less than $-25$ r.p.m. If the difference $\Delta N$ is more than 25 r.p.m., it is checked at a decision block 546 to determine whether control operation to decrease the engine speed is masked. If the decision of the block 546 is YES, then the control is made by open loop control. However, if the decision of the block 546 is NO, feedback control is used to decrease the actual engine speed $N_{RPM}$ to adapt the same to the reference engine speed $N_{SET}$. If the difference $\Delta N$ is less than $-25$ r.p.m., then feedback control starts to increase the actual engine speed $N_{RPM}$ to match the reference engine speed $N_{SET}$. On the other hand, if the difference $\Delta N$ is in a range between $-25$ r.p.m. to 25 r.p.m., namely it is in a dead band, open loop control is also carried out.

In the above described program, each of the foregoing factors is checked, as follows:
FACTOR I is checked at the block 302;
FACTOR II is checked at the block 312;
FACTOR III is checked at the block 314;
FACTOR IV-1 is checked at the block 318;
FACTOR IV-2 is checked at the block 322; and
FACTOR IX and FACTOR X are checked at the block 544.

Therefore, when the FACTOR I is not satisfied, open loop control is carried out. Likewise, if both FACTOR II and FACTOR III are not satisfied, open loop control is carried out. Further, if neither of FACTOR IX and FACTOR X is satisfied, open loop control is carried out. When either one of following combinations is satisfied, feedback control is carried out:
FACTOR I AND FACTOR IX
FACTOR I AND FACTOR IV-2 AND (FACTOR II OR FACTOR III) AND FACTOR IV-2 AND FACTOR X According to the present invention, by varying the combination to perform the feedback control for increasing or decreasing the engine speed, the control operation can be switched stably between feedback control and the open loop control. Further, therefore it can effectively preventing stalling upon changing the control operation.

When feedback control is carried out, engine speed is controlled corresponding to the actual engine speed $N_{RPM}$ and a difference $\Delta N$ between the actual engine speed and the reference engine speed. For determining difference $\Delta N$, the reference engine speed $N_{SET}$ is compared with an actual engine speed $N_{RPM}$ which determined by the crank angle sensor signal. Thus, the difference $\Delta N$ ($N=N_{RPM}-N_{SET}$) between the reference engine speed $N_{SET}$ and the actual engine speed $N_{RPM}$ is obtained. Corresponding to the difference $\Delta N$, the microcomputer determines the control signal. The control signal is an output signal of the control signal generator which consists of a proportional element and an integral element. The microcomputer further determines the pulse width of the pulse signal for controlling the electromagnetic actuator 92. Thereby, the intake air flow rate in the idling condition of the internal combustion engine in the specific operating condition is controlled so as to match the actual engine speed $N_{RPM}$ with the reference engine speed $N_{SET}$ at an adequate rate.

Figure 17:
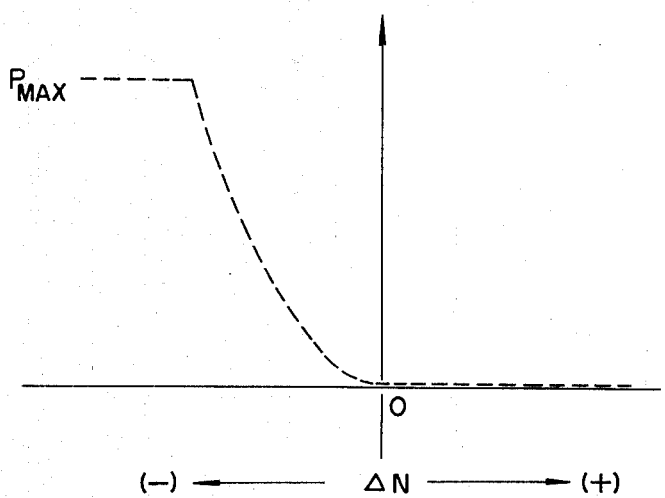
FIG. 17 is a graph showing variation of a proportional constant of a proportional element of a control signal generator.

In feedback control of the internal combustion engine, the proportional constant of the control signal generator or control ratio is generally used to vary the changing rate of the control signal i.e. the response characteristics of the feedback control system and the rate of getting the engine speed $N_{RPM}$ equal to the reference engine speed $N_{SET}$. If the proportional constant is too large, and thereby the changing rate of the control signal is excessively high, the duty cycle of the pulse signal applied to the actuator 92 is too frequently varied. It may cause hunting in the feedback control system due to frequent changes in the pulse duty cycle of the control signal controlling the electromagnetic actuator 92. Since the response time period from the time when the intake air flow rate is varied to the time when the engine speed is actually changed reduces with increase of the engine speed, hunting will occur more frequently in higher engine speed ranges. On the other hand, if the engine speed is slower, the response time period will be rather longer than that required and thereby possibly cause engine stall. Therefore, according to the present invention, the response characteristics of the feedback control system are improved by decreasing the proportion constant in a range of higher engine speed and increasing it in a range of lower engine speed to compensate for the inherent change of the response time period of the engine. FIG. 17 shows a graph of the setting of the proportional constant with respect to the difference $\Delta N$ during idling of the internal combustion engine, according to the present invention. As will be observed from FIG. 17, to prevent the internal combustion engine from hunting, when the actual engine speed $N_{RPM}$ is higher than a reference engine speed $N_{SET}$, and therefore the pulse signal with smaller pulse duty is applied to the actuator 92, the proportional constant is preset to 0. On the other hand, when the actual engine speed $N_{RPM}$ is lower than the reference engine speed $N_{SET}$, the proportional constant will be proportional to square of the difference $\Delta N$ of the actual and reference engine speeds. Thereby, stalling will be effectively prevented even when the engine speed is rather slow with respect to the reference speed.

Figure 18:
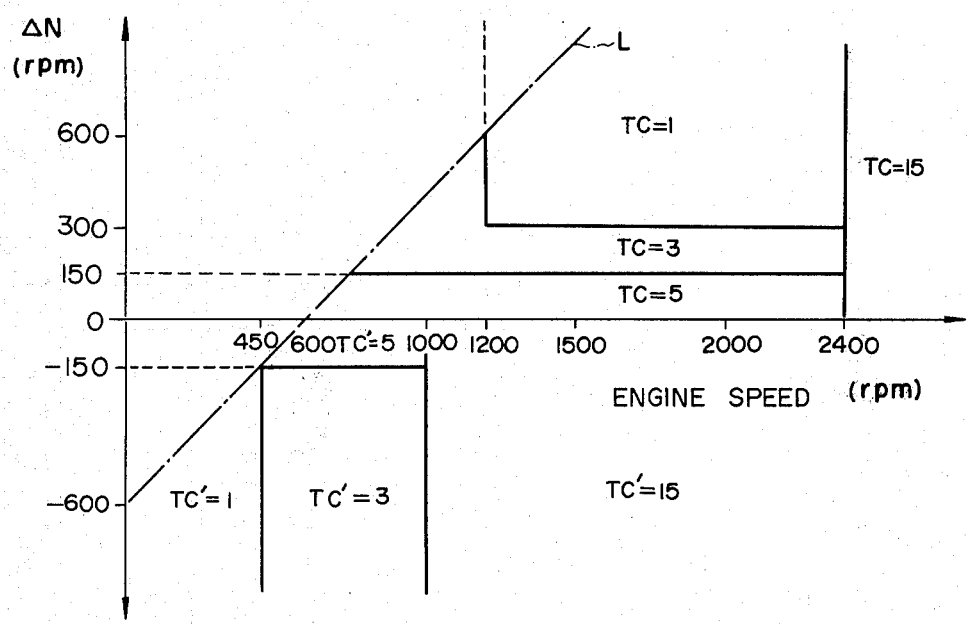
FIG. 18 is a graph showing variation of an integral constant of an integral element of the control signal generator.

It is also required to vary an integral constant of the control signal generator in order to adjust the changing rate of the control signal depending on the difference $\Delta N$ and the actual engine speed $N_{RPM}$. FIG. 18 shows characteristics of the integral constant. In FIG. 18, TC and TC' denote the time constants of the integral element of the control signal generator. The output of the integral element of the control signal generator increases or decreases at the rate of 0.5%, for example, of the output of the integral element per the number of TC' or TC respectively. For example TC=1 indicates that the output is decreased by 0.5% of the output per one engine revolution and TC'=15 indicates that the output is increased by 0.5% of the output every 15 engine revolutions. For preventing the internal combustion engine from hunting, the number of TC is increased corresponding to an increase of actual engine speed and to a decrease in the difference $\Delta N$ of the actual and reference engine speeds. The number of TC' is increased corresponding to the increase of the actual engine speed and to the decrease of the absolute value of the difference $\Delta N$.

It will be noted that, in FIG. 18, the region to the left side of the chained line (L) is a blank space which will not occur during actual operation of the internal combustion engine, if the idling speed is set at 600 r.p.m. It should be further noted that when the engine speed is below 1200 r.p.m., the TC=3 range is extended to higher values of $\Delta N$ to prevent engine stalling, which is easily caused by rapidly decreasing the engine speed in this range. Further, although the above-mentioned FIGS. 9 and 10 show characteristics of the proportional constant and integral constant which are not varied linearly, it is possible to vary the constants approximately linearly.

Figure 19:
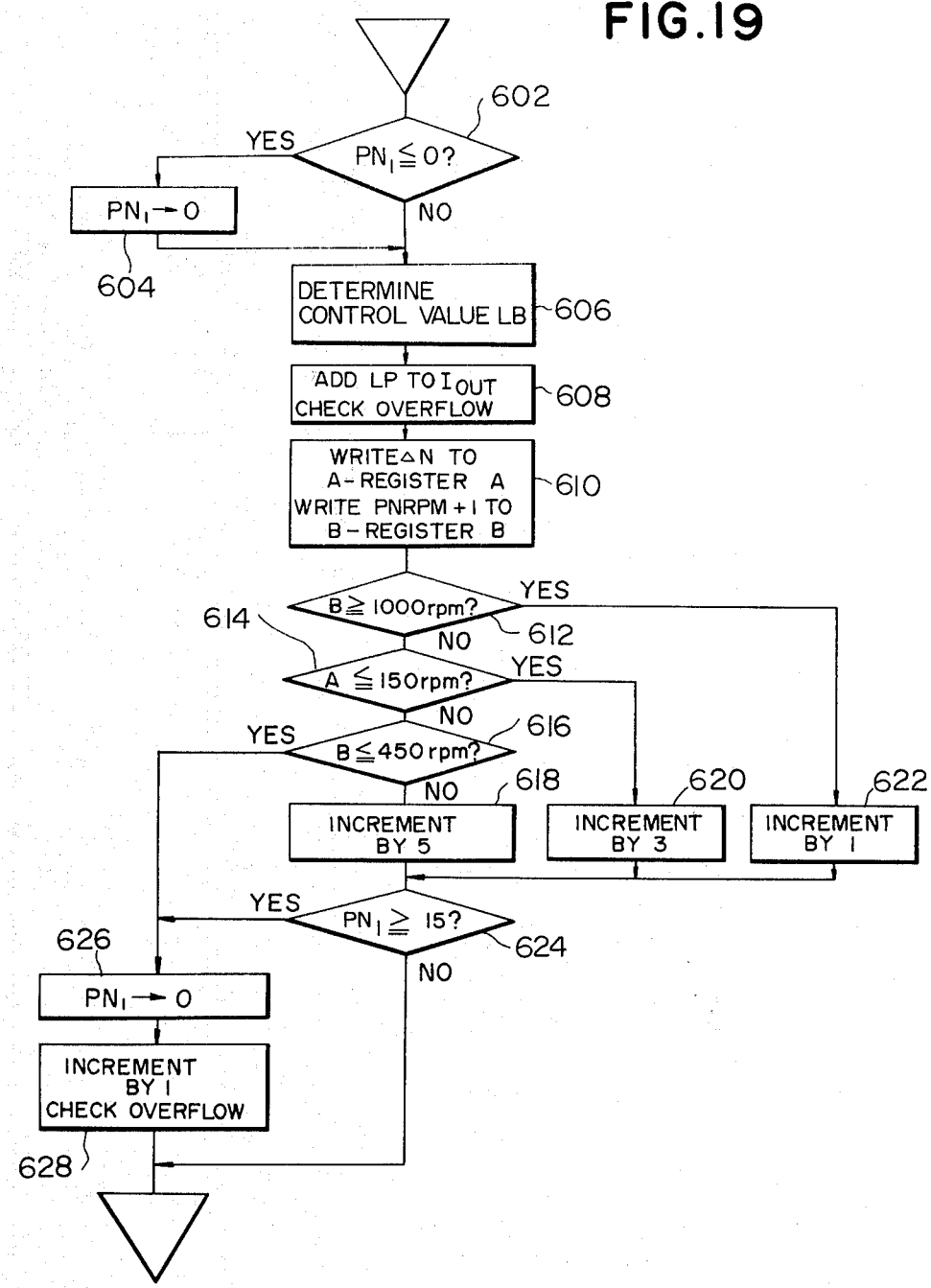
FIG. 19 is a flowchart of a program for correcting the control ratio to be executed when the reference engine speed is higher than the actual engine speed.
Figure 20:
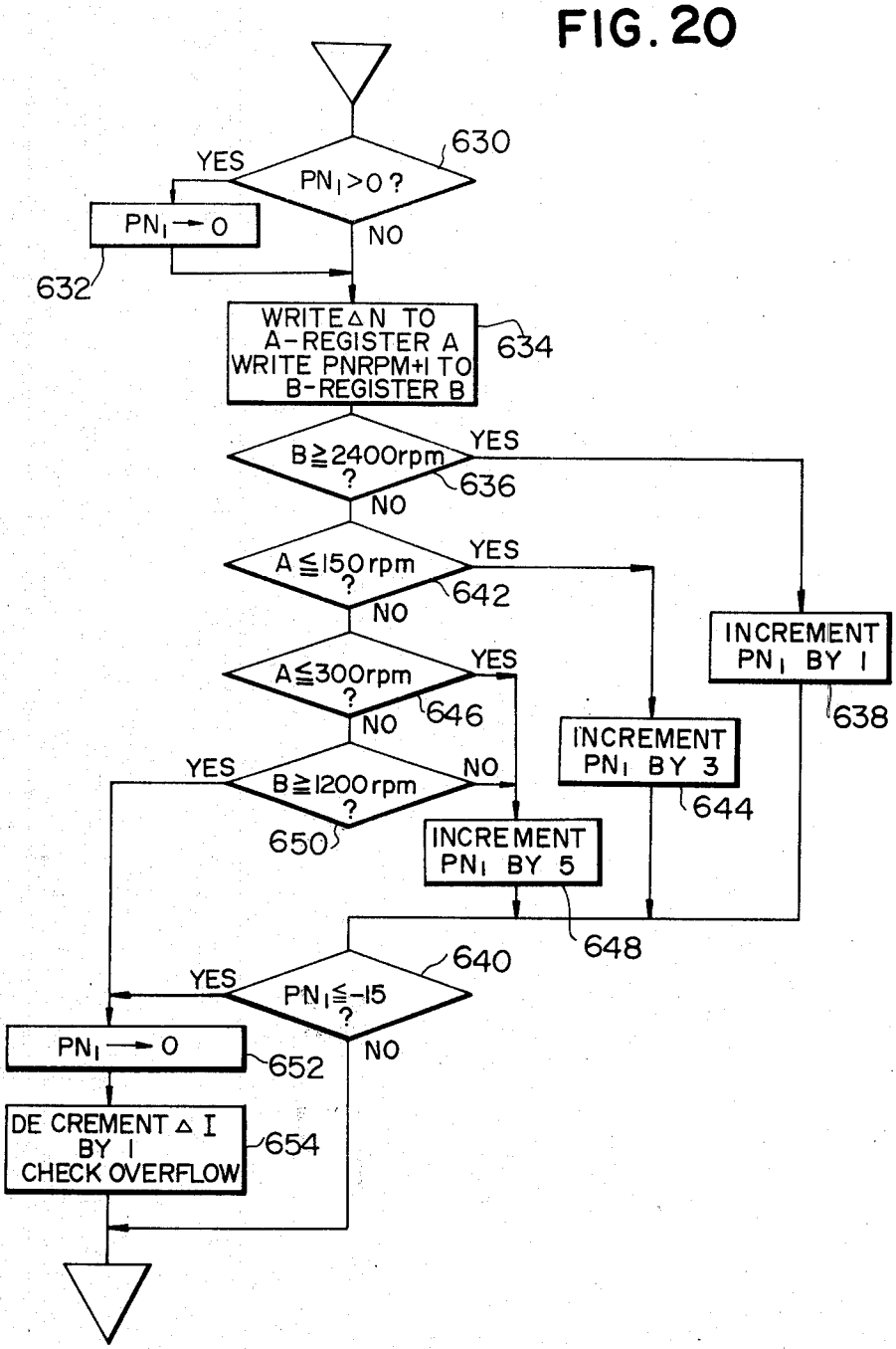
FIG. 20 is a flowchart of a program for correcting the control ratio to be executed when the actual engine speed is higher than the reference engine speed.

Referring now to FIGS. 19 and 20, there are shown flowcharts of programs which are executed to determine the integral constant with respect to the difference $\Delta N$ and the actual engine speed $N_{RPM}$. FIG. 19 shows a flowchart to be executed to determine the integration constant when the actual engine speed $N_{RPM}$ is lower than the reference engine speed $N_{SET}$ and FIG. 20 shows a flowchart to be executed when the actual engine speed $N_{RPM}$ is higher than the reference speed $N_{SET}$. When the microcomputer operates to determine the integral constant with respect to the difference $\Delta N$ and the actual engine speed $N_{RPM}$, at first the microcomputer checks to determine whether the actual engine speed $N_{RPM}$ is higher or lower than the reference engine speed $N_{SET}$ and then the program to be executed is selected.

Meanwhile, in a computer controlled engine control system, a value $ISC_{ON}$ of the control signal for the internal combustion engine when idling is determined from the following formula:

$$ISC_{ON} = ISC_{TW} + ISC_{AT} + ISC_{TR} + ISC_{AS} + ISC_{CL} \quad \text{(Formula I)}$$

where
- $ISC_{TW}$ is a basic control value of the control signal depending on engine temperature;
- $ISC_{AT}$ is a value for correction for automatic transmission;
- $ISC_{TR}$ and $ISC_{AS}$ are correction values for acceleration and deceleration respectively of the engine; and
- $ISC_{CL}$ is a correction value for feedback control.

Referring to FIG. 19, the program for determining correction value $ISC_{CL}$ by feedback control is executed for every engine revolution if the actual engine speed $N_{RPM}$ is lower then the reference speed $N_{SET}$. In the decision block 602, the value of a counter $PN_1$ is checked as to whether the value $PN_1$ is smaller than or equal to zero. The value $PN_1$ of the counter is smaller than or equal to zero when the actual engine speed $N_{RPM}$ is higher than the reference speed $N_{SET}$. Therefore, if the value $PN_1$ of the counter is smaller than or equal to zero, the value of counter $PN_1$ is reset to zero in block 604. After clearing the value of counter $PN_1$ in the processing block 604 or when the value $PN_1$ is larger than zero, an output of the proportional element of the control signal generator is calculated in a processing block 606. The calculation for obtaining the proportional constant is performed and the difference $\Delta N$ is multiplied by the proportional constant as shown in FIG. 9, for example, and then the output of the proportional element (LP) is obtained. Thereafter, to the output value LP obtained at the processing block 606 is added the sum of control value $I_{OUT}$ (=$ISC_{TW}$+$ISC_{AT}$+$ISC_{TR}$+$ISC_{AC}$) other than control value $ISC_{CL}$ of the feedback control at a processing block 608. After adding the control value $I_{OUT}$ to the output value LP, overflow checking is carried out with respect to the sum ($LP + I_{OUT}$) obtained. In a processing block 610, the difference $\Delta N$ between the actual engine speed $N_{RPM}$ and the reference engine speed $N_{SET}$ is stored in register A. Also in the processing block 610, the actual engine speed $N_{RPM}$ stored in an input register PNRPM+1 is stored in register B. In a decision step 612, the actual engine speed $N_{RPM}$ is checked to determine whether it is higher than 1000 r.p.m. If the actual engine speed $N_{RPM}$ is higher than 1000 r.p.m., control jumps to a processing block 622, and otherwise, to a decision block 614. In the processing block 622, the value of counter $PN_1$ is incremented by 1. Decision block 614 checks to determine whether the difference $\Delta N$ stored in register A is lower than 150 r.p.m. If the difference $\Delta N$ is larger than 150 r.p.m., control jumps to a process block 620 in which the value of counter $PN_1$ is incremented by 3, and otherwise to a decision block 616. The decision block 616 checks to determine whether the actual engine speed $N_{RPM}$ stored in register B is lower than 450 r.p.m. When the actual engine speed $N_{RPM}$ is lower than 450 r.p.m., control jumps to a processing block 626 and otherwise, to a processing block 618. In the processing block 626, the value of counter $PN_1$ is cleared to 0. In processing block 618, the value of counter $PN_1$ is incremented by 5. The value of counter $PN_1$ incremented in blocks 618, 620 or 622 is checked to see if the value of $PN_1$ is 15 or more at a decision block 624. If the value $PN_1$ is 15 or more, then control skips to the processing block 626. Otherwise, control jumps to program end. When the actual engine speed $N_{RPM}$ is lower than 450 r.p.m. or the counter value $PN_1$ is 15 or more, after clearing the counter value $PN_1$ to 0 at the processing block 626, the value ($\Delta I$) of a correcting counter, which corresponds to the output of the integral element, is incremented by 1 to increment the output of the integral element by 0.5% per increment of 1 and thereafter overflow checking is carried out in a processing block 628.

When the actual engine speed $N_{RPM}$ is lower than 450 r.p.m. and the absolute value of the difference $\Delta N$ of the actual engine speed $N_{RPM}$ and the reference engine speed $N_{SET}$ is higher than 150 r.p.m., i.e. when engine speed is in the area $T'=1$ of FIG. 18, the value of the correcting counter $\Delta I$ is incremented by 1 per engine revolution. When the actual engine speed $N_{RPM}$ is greater than or equal to 450 r.p.m. but lower than 1000 r.p.m. and the absolute value of the difference $\Delta N$ of the actual engine speed $N_{RPM}$ and the reference engine speed $N_{SET}$ is higher than 150 r.p.m., i.e., the engine speed is in the area $T'=3$ of FIG. 18, the value of the correcting counter $\Delta I$ is increased by one every 3 engine revolutions. When the actual speed $N_{RPM}$ is lower than 1000 r.p.m. and the absolute value of the difference $\Delta N$ is also lower than 150 r.p.m., i.e., the engine speed is in the area $T'=5$ of FIG. 18, the value of the correcting counter $\Delta I$ is increment by 1 every five engine revolutions. Further, when the actual engine speed $N_{RPM}$ exceeds 1000 r.p.m., i.e., engine speed is in area $T'=15$ of FIG. 18, the value of the correcting counter $\Delta I$ is increased by 1 every 15 engine revolutions. As mentioned before, for every increment of 1 in the value of the correcting counter $\Delta I$, the correction value $LSC_{CL}$ is incremented by 0.5% of the output of the integral element.

Referring to FIG. 20, there is illustrated a flowchart of a program for determining the correction value $ISC_{CL}$ by feedback control when the actual engine speed $N_{RPM}$ is higher than the reference engine speed $N_{SET}$. This program is executed once for every engine revolution. First, the value of counter $PN_1$ is checked to see if it is larger than 0 in a decision block 630. If the value of the counter $PN_1$ is larger than 0, the value $PN_1$ is cleared or reset to 0 at a processing block 632. After setting the value of the counter $PN_1$ to 0 or when the value of counter $PN_1$ is less than or equal to 0, the difference $\Delta N$ of the actual engine speed $N_{RPM}$ and the reference engine speed $N_{SET}$ is registered in the register A and the actual engine speed $N_{RPM}$ registered in the input register PNRPM+1 is written in register B, at a processing block 634. Thereafter, the actual engine speed data registered in register B is read and checked whether it is higher than 2400 r.p.m. at a decision block 636. When the actual engine speed $N_{RPM}$ exceeds 2400 r.p.m., the counter value $PN_1$ is decremented by 1 at a processing block 638 and fed to a decision block 640 to be checked to determine whether the counter value $PN_1$ is equal to or less than $-15$. If the actual engine speed $N_{RPM}$ is lower than 2400 r.p.m., the difference $\Delta N$ registered in the register A is read and checked to determine whether the difference $\Delta N$ is lower than 150 r.p.m. at a decision block 642. If so, the counter value $PN_1$ is decremented by 3 at a processing block 444. Thereafter, the counter value $PN_1$ is checked whether it is less than $-15$ at the decision block 640. When the difference $\Delta N$ exceeds 150 r.p.m., the difference $\Delta N$ is further checked to determine whether it is lower than 300 r.p.m. at a decision block 646. If so, the counter value $PN_1$ is decremented by 5 at a processing block 648 to be checked to determine whether the counter value $PN_1$ is less than $-15$ at the decision block 640. When the difference $\Delta N$ exceeds 300 r.p.m., then the actual engine speed $N_{RPM}$ is checked again to determine whether it exceeds 1200 at a decision block 650. If the actual engine speed $N_{RPM}$ is lower than 1200 r.p.m., the counter value $PN_1$ is decremented by 5 at the processing block 648. If the actual engine speed $N_{RPM}$ is higher than or equal 1200 rpm, the counter value $PN_1$ is reset to zero at a processing block 652. If the value $PN_1$ is equal to or less than $-15$ at the decision block 640, the value $PN_1$ is reset to zero at the block 652, and otherwise, the program jumps to the end. Thereafter, the value of the correcting counter $\Delta I$ is decremented the value by each unit. Per 1 of the correcting counter value I, the feedback control value is reduced by 0.5 percent of the output of the intergral element.

It will be appreciated that, between the programs shown in FIGS. 19 and 20, there is a principal difference that the calculation of the value LP, which corresponds to the output of the proportional element, on the processing block 606 of FIG. 19 is not observed in FIG. 20. This is the reason as mentioned hereinbefore, that in case the actual engine speed $N_{RPM}$ exceeds the reference engine speed, it is not necessary and further not desirable to control the engine by the value LP to avoid hunting.

Now returning to FIG. 20, as mentioned above, when the actual engine speed $N_{RPM}$ is more than 2400 r.p.m., i.e., engine speed being in a range $TC=1$ of FIG. 18, the correcting counter value $\Delta I$ is decremented by 1 per every fifteen rotations of the engine. When the actual engine speed $N_{RPM}$ is equal to or less than 2400 r.p.m. but more than 1200 r.p.m. and the difference $\Delta N$ is more than 300 r.p.m., i.e., the engine speed is in a range $TC=1$ of FIG. 18, the correction counter value $\Delta I$ is decremented by 1 per every one cycle of engine revolution. When the actual engine speed $N_{RPM}$ is equal or less than 2400 r.p.m. and the difference $\Delta N$ is equal or less than 150 r.p.m., i.e., the engine speed being in a range $TC=5$ of FIG. 18, the correction counter value $\Delta I$ is decremented by 1 per every five cycles of engine revolution. In the remaining range of engine speed, i.e.:

actual engine speed $N_{RPM}$ is more than 1200 r.p.m. but equal to or less than 2400 r.p.m., and the difference $\Delta N$ is more than 150 r.p.m. but less than 300 r.p.m.; and actual engine speed $N_{RPM}$ is equal to or less than 1200 r.p.m. and the difference $\Delta N$ is equal or more than 300 r.p.m., which is included in a range TC=3 of FIG. 18, the value of the correction counter $\Delta I$ is incremented by one per every three cycles of the engine revolution.

In case of using two of bits (8 bits=one byte) as the value of the correction counter $\Delta I$ and the maximum significant digit of each counter value being indicative of distinction of plus or minus of the value, the value of the correction counter $\Delta I$ will be in a range from plus 127 to −128. Therefore, the control value will be corrected in a range +64 percent to −64 percent, if each unit of the $\Delta I$ corresponds to 0.5%. If the correction counter value $\Delta I$ exceeds the abovementioned range, i.e. the range between 127 and −128, the maximum-value, 127 spare or minimum value, −128 will be regarded as the correction counter value $\Delta I$. On the other hand, one byte will be used for operation of actual engine speed $N_{RPM}$ within a range 12.5 to 3200 r.p.m. as shown in FIG. 6(B). Thereby the actual engine speed $N_{RPM}$ can be operated at a maximum 3185.5 r.p.m. (3,200 −12.5). Indeed, even if the actual engine speed $N_{RPM}$ exceeds 3200 r.p.m., it can be operated at 3187.5 r.p.m., since operating at a further higher range of a engine speed will be unnecessary for idle engine control. Actually, exceeding 3200 r.p.m. of engine speed will occur in engine idle position.

When the vehicle starts driving, and then the throttle valve is changed in position from closed to opened, the control for the intake air flow rate will be performed by the open loop control. If the feedback control is used for such a transient condition, it can not follow the remarkable change of required air flow rate. According to the present invention, at the moment when the vehicle is rapidly accelerated or decelerated wherein it is necessarily change the required air flow rate, the control duty cycle applied to the electro-magnetic actuator 92 of the idle control valve 84 is rapidly changed corresponding to the required air flow rate by open loop control.

At the moment of acceleration of the vehicle, the pulse duty cycle of the control pulse signal determined by the open loop control is considerably increased. The air flow rate is thereafter decreased gradually so as to prevent engine stall which will occur if decreasing of the air flow rate after acceleration is excessively rapid. It will be appreciated that when the vehicle speed is relatively high, since engine stopping will not likely occur, the rapid change of the air flow rate, as mentioned above, is unnecessary. Further, upon shifting gear position, because rapid change of the vehicle speed will occur, since the shifting of the gear will take place at relatively high vehicle speed, it is also unnecessary to effect the above mentioned control operation.

In the air flow rate control system according to the present invention, either feedback control or open loop control is selectively carried out corresponding to engine driving conditions. In open loop control, a control signal to be applied to the actuator 92 is determined corresponding to the engine coolant temperature measured by the coolant temperture sensor 114. On the other hand, in feedback control, the control signal is determined corresponding an actual engine speed and a difference between the actual engine speed and a reference engine speed.

The intake air flow rate will be corrected under the specific driving condition that the throttle value angle sensor 122 detects the throttle valve being opened, transmission being in driving range, the vehicle speed exceeding 8 km/h and the coolant temperature being higher than 74° C. in open loop control. The correction of the control signal is issued by way of table look up with respect to the following correction table relative to the engine speed:

TABLE

| Engine Speed (r.p.m.) | Correction Value (%) | Engine Speed (r.p.m.) | Correction Value (%) |
|---|---|---|---|
| 0 | 0 | 1600 | 8.5 |
| 200 | 0 | 1800 | 13 |
| 400 | 0 | 2000 | 17 |
| 600 | 0 | 2200 | 22 |
| 800 | 0 | 2400 | 30 |
| 1000 | 0 | 2600 | 35 |
| 1200 | 0 | 2800 | 40 |
| 1400 | 3.5 | $3000 \geqq$ | 45 |

In the correction operation by table look up, when the engine speed is intermediate between two of the given speeds, the correction rate will be obtained by interpolation in a known manner.

Figure 21:
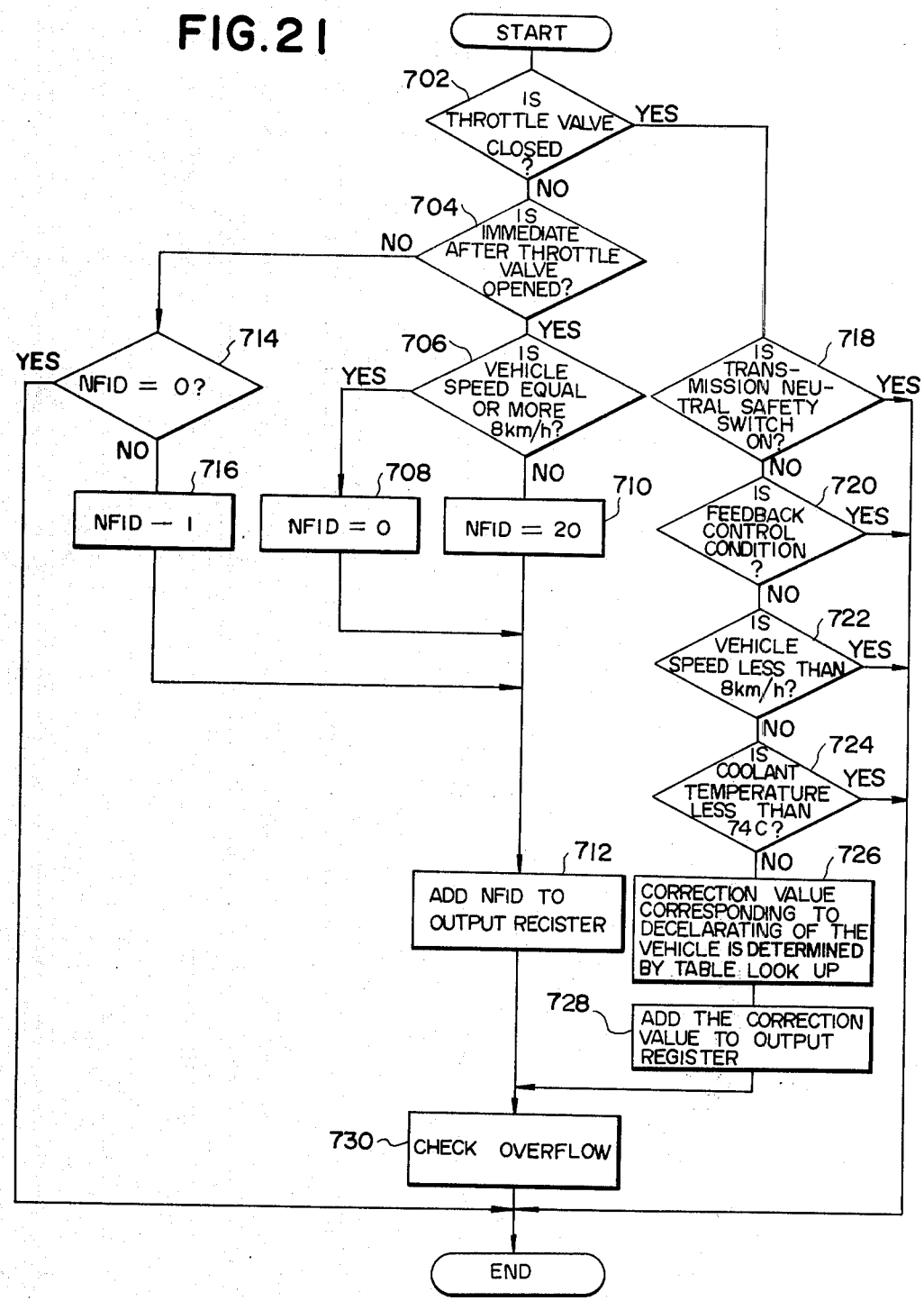
FIG. 21 is a flowchart of a program to be executed in order to adjust the control ratio in response to acceleration or deceleration of the vehicle.

Now referring to FIG. 21, there is illustrated a flowchart of a program to be executed to correct the control signal and thereby to correct the air flow rate in response to acceleration and deceleration of the vehicle. When the vehicle speed is more than 8 km/h and additionally but essentially, the throttle valve is opened, this program is executed to correct the control signal.

At first, the throttle valve angle sensor signal is checked to determine whether the throttle valve is closed, at a decision block 702. When the throttle valve is opened and therefore the decision of the block 702 is NO, whether it is immediate after the throttle valve being opened is checked at a decision block 704. If so, at a decision block 706, is checked whether the vehicle speed is equal to or more than 8 km/h. When the vehicle speed is equal to or more than 8 km/h, the incremental correction rate NFID for the control signal is set to 0 at a block 708. If the vehicle speed is less than 8 km/h and therefore, the decision of the block 706 is NO, the incremental correction rate NFID is set to 20 at a block 710. The correction rate NFID determined at the block either 708 or 710 is added to a ratio stored in the output register at a block 712.

When the decision of the block 704 is NO, i.e., the time of issue of the block 704 is not immediate after the throttle being opened, the correction rate NFID is checked to determine whether it is 0 at a decision block 714. If the decision of the block 714 is YES, then the process of the program goes to the end of the program and skips to the other program. Otherwise, the correction rate NFID is decremented by 1 at a block 716 and thereafter added to the value stored in the output register at the block 712.

On the other hand, if the throttle valve is in a closed position, and therefore, the decision at the block 702 is YES, the transmission neutral switch is checked to determine whether it turns on, at a decision block 718. If the decision at the block 718 is NO, then whether the control is carried out by feedback control is checked at a decision block 720. When the decision at the block 720 is NO, the vehicle speed is checked to determine whether it is less than 8 km/h, at a decision block 722. If the vehicle speed is equal or more than 8 km/h, and therefore, the decision at the block 722 is NO, the coolant temperature is checked to determine whether it is less than 74° or not, at a decision block 724. If the decision at the block 724 is NO, the table for determining the correction rate corresponding to deceleration of the vehicle is looked up to determine the correction rate corresponding to the engine speed, at a block 726. Thereafter, the correction rate determined at the block 726 is added to the control rate stored in the output register at a block 728.

Meanwhile, if either one of the decisions at the blocks 718, 720, 722 and 724 is YES, the program goes to end.

After processing at the block 712 or 728, the control rate stored in the output register is checked for overflow, at a block 730.

Correction rate NFID corresponds to a 0.5% pulse duty cycle of the control signal per unit. Therefore, when the pulse duty cycle is corrected by increment 20 at the block 710, the pulse duty cycle is actually incremented by 10%. The incremented pulse duty cycle is thereafter decreased gradually. The blocks 714 and 716 process gradual decreasing of the incremented pulse duty cycle until the correction rate NFID become 0. Namely, in the shown embodiment, the incremented pulse duty cycle is decreased at a rate of 0.5% corresponding to unit of the correction ratio NIFD, at the block 716. Therefore, after incrementation of the pulse duty cycle in response to opening of the throttle valve, the incremented pulse duty cycle is decreased step by step at a rate 0.5% and the correction rate is brought to 0 through 20 executions of the program. Since the program is executed once per cycle of engine revolution, the increased pulse duty cycle is returned to normal rate at 20 cycles of the engine revolution. By this, the present control system can fulfill the requirement for increasing of the intake air flow rate upon start of driving and prevent engine stalling due to lack of the air flow rate by gradually reducing the incremented correction rate.

On the other hands, when the vehicle is rapidly decelerated, the correction value rate of the pulse duty cycle is determined at the block 726. For detecting vehicle deceleration, checking of the driving condition is made at respective blocks 718, 720, 722 and 724. When the transmission neutral switch is ON, i.e., the transmission is in neutral range, namely engine braking will not occur, it is unnecessary to correct the control ratio. If the neutral switch is OFF but the feedback control is taking place, it is also unnecessary to correct the pulse duty cycle, since the pulse duty cycle will be corrected by the feedback control operation corresponding to the actual engine speed and difference of the actual engine speed and reference engine speed. If in such condition, further correcting operation is taking place, it will cause excessive increasing of the pulse duty cycle. Further, when the vehicle speed is less than 8 km/h, engine braking will also not arise. At this position, even if the throttle valve is closed and neutral switch is OFF, it indicates the vehicle is being decelerated without causing the engine to brake. Additionally, when the coolant temperature is lower than 74° C., correction of the pulse duty cycle will be taking place corresponding to the coolant temperature. Therefore, it is unnecessary to increment the pulse duty cycle depending on deceleration of the vehicle. As stated above, the conditions neutral switch OFF, feedback control not taking place, vehicle speed equal to or more than 8 km/h and the coolant temperature equal to or higher than 74° C. are ANDed provide correction by table look up at the block 226. However, in the shown embodiment, the correction rate is determined by table look up, it will be possible to obtain the correction rate otherwise, for example, by a formula that is a function of the actual engine speed.

As stated above, the electromagnetic actuator 92 of the valve means 84 is provided with a dead band within which it will not actuate the valve element in response to the control output. Therefore, if the control signal is within a specific range which corresponds to the dead band, it is impossible to control the air flow rate and thereby to control the idle engine speed. For avoiding this, the control signal is defined within a range between maximum and minimum duty cycle. Assume the feedback control signal $S_2$ to $\Delta I$, and the open loop control signal $S_1$ to be $I_{OUT}$, and, when the control signal $S_3$ ($=\Delta I + I_{OUT}$) is equal or less than a given minimum value $K_L$, for example 10% of the engine speed, the feedback control signal $S_2$ to be corrected to $\Delta I = K_L - I_{OUT}$. Therefore, the control signal $S_3$ can be also limited at the given minimum value $K_L$. On the other hand, when the control signal $S_3$ is equal to or more than a given maximum value $K_H$, it is corrected at the maximum value so as not to exceed the maximum value. At this time, the feedback control signal $S_2$ and the open loop control signal $S_1$ are not corrected. Thereby, the control signal may be prevented from entering the dead band of the actuator so as to continuously control the idle engine speed with respect to the given reference speed determined corresponding to conditions of various engine parameters.

Figure 22:
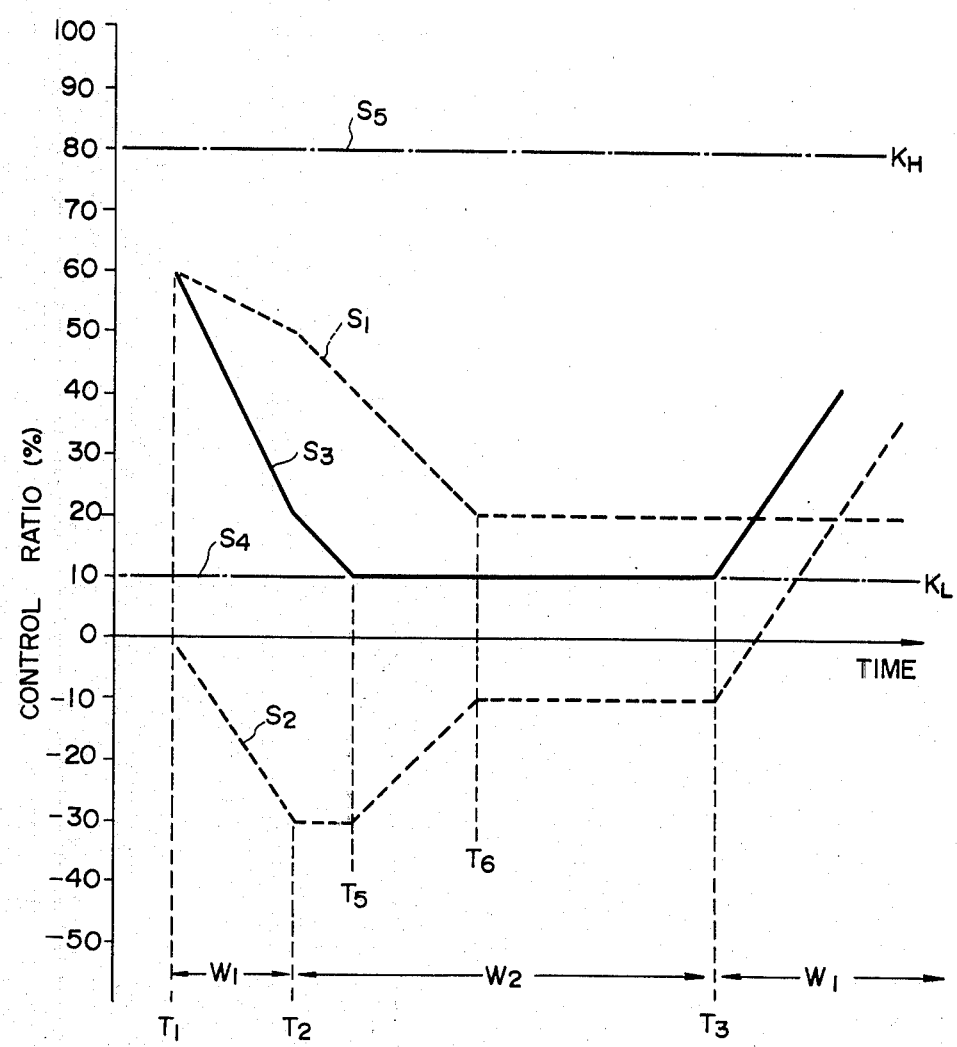
FIG. 22 is a graph showing the characteristic of control ratio consisting of feedback rate and open loop rate, wherein the control rate is limited at the minimum and maximum ratios defined according to the present invention, particularly in a case wherein the control ratio is gradually decreased.

FIG. 22 shows a graph illustrating the relationship of the feedback control signal $S_2$, the open loop control signal $S_1$, the control signal $S_3$ and the minimum value $K_L$. Here, assuming engine starting at a point $T_1$, at first both the feedback control signal $S_2$ and the open loop control signal $S_1$ are relatively high depending on relatively high engine load. Thereafter, both are gradually decreased. According to this, the control signal $S_3$ is decreased gradually. At the point $T_5$ where the control signal $S_3$ becomes equal to the minimum value $K_L$, correction is made for correcting the feedback control signal $S_2$ so that the value $\Delta I$ thereof is in a relationship such as $\Delta I = K_L - I_{OUT}$. Therefore, until the point $T_6$ where the open loop control signal $S_1$ stops decreasing, the control signal $S_2$ is gradually increased inversely proportional to the former in order to maintain the control signal $S_3$ even and equal to the minimum value $K_L$. At a point $T_3$ after carrying out open loop control within a period $W_2$, if the feedback control is carried out, and the control signal $S_2$ starts to be increased, the control signal $S_3$ is increased proportional thereto. At this time, since the control signal $S_3$ is not within the dead band i.e., less than $S_4$, the actuator can immediately respond to vary actuation in response to increasing of the control signal $S_3$. Thus, delay of response can be effectively eliminated to prevent the vehicle from causing engine stop.

Figure 23:
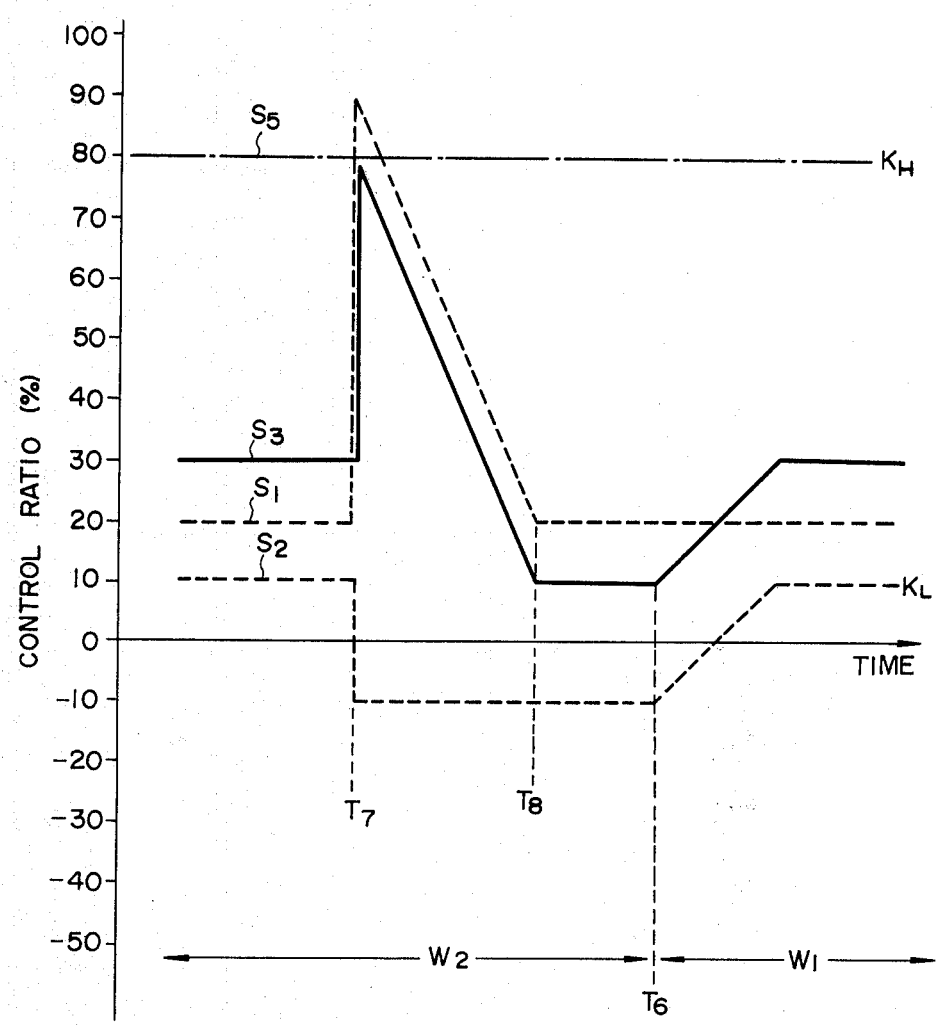
FIG. 23 is a graph similar to FIG. 22, wherein is shown a limited control ratio limited at the maximum ratio of variation of the control ratio.
Figure 24:
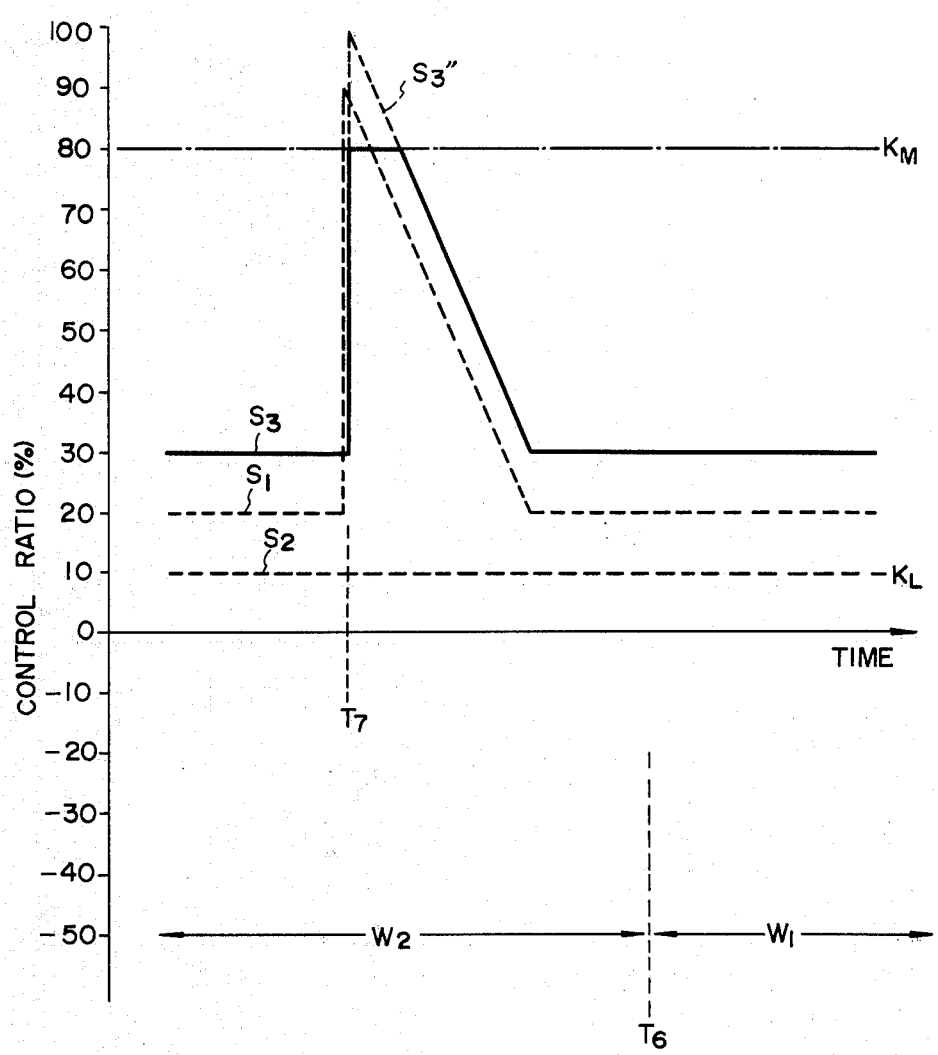
FIG. 24 is a graph also similar to FIG. 22, wherein is shown a control ratio limited at the maximum ratio by the modified method of FIG. 23.

FIGS. 23 and 24 respectively show the relationship between the control signal and the given maximum ratio $K_H$, under the control system according to the present invention. In FIG. 23, when the throttle valve is closed at a point $T_7$ while the vehicle is in open loop control, the vehicle is decelerated, by the correction of the control signal S3 corresponding to increasing of the required air flow rate which is carried out momentarily by increasing open loop control signal S1. When the increased control signal S3 exceeds the maximum value $K_H$ by excessively increasing open loop control signal S1, the feedback control value S2 is corrected to satisfy the relationship $\Delta I = K_H - I_{OUT}$. In this system, when the open loop control signal S1 is excessively high, the feedback control signal S2 is corrected to a substantially low value. This will possibly cause engine stall during gradual decreasing of the corrected control signal S3. Namely, a a point T8 when the open loop control signal S1 decreases the increased ratio in response to deceleration of vehicle to return to normal value, the control signal S3 substantially reduces to cause engine stall. In this system, although at a point T6 when the feedback control is carried out, and the feedback control signal S2 is increased to the normal level, engine stall can not be effectively prevented due to delay of response between from the point T8 to the point T6.

As shown in FIG. 24, according to the present invention, when the increased control signal S3 exceeds the given maximum ratio $I_H$, i.e., the portion S3" in the drawing, the control signal S3 is corrected to limit at a maximum ratio $K_H$. At this time, the feedback control signal S2 is not corrected. Therefore, when the correction of the control signal S3 in response to deceleration of the vehicle is finished, the control signal S3 can immediately return to the normal level and not cause the engine stall.

It should be noted that the correction of the control value responsive to deceleration of the vehicle is momentarily carried out. Therefore, the unit time in FIGS. 23 and 24 are substantially short in comparison with that of FIG. 3.

Figure 25:
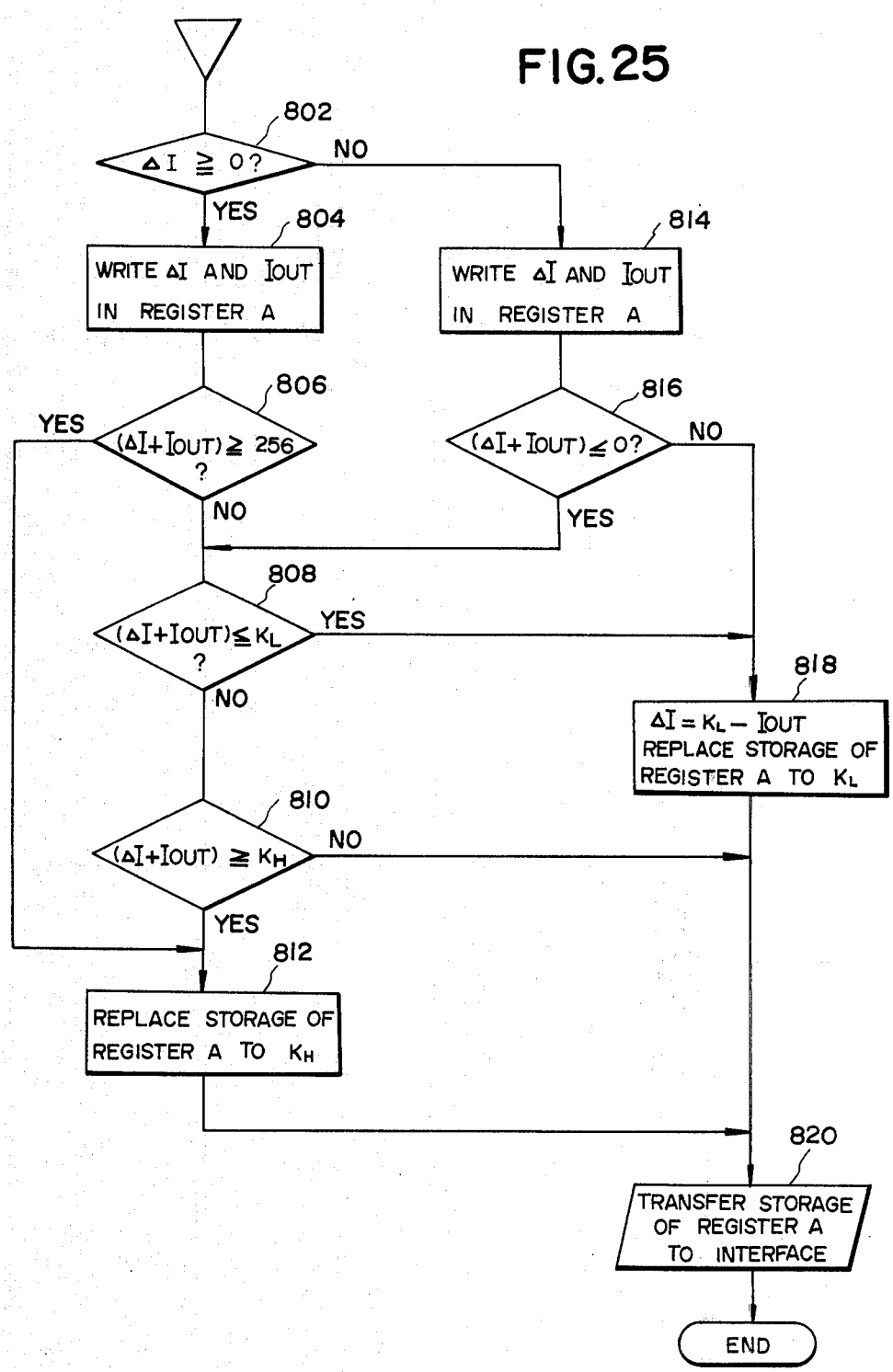
FIG. 25 is a flowchart of a program for limiting the rate of varying the control ratio according to the given response characteristics as shown in FIGS. 22 to 24.

Now referring to FIG. 25, there is illustrated a flowchart of a program for correcting the control signal with respect to the given minimum and maximum ratios. This program is executed after running of the correction program for the air flow rate corresponding to increasing of required rate upon accelerating or decelerating of the vehicle. At a decision block 802, the feedback control ratio $\Delta I$ is checked. If the feedback control ratio $\Delta I$ is equal to or larger than 0, the sum of the feedback control ratio $\Delta I$ and the open loop control ratio $I_{OUT}$ is set in the register A at a block 804. The sum stored in the register A is checked at a decision block 806. When the sum exceeds capacity of 8 bits, i.e., 256, the storage of the register A is replaced by the even maximum ratio $K_H$ at a block 812. If the sum is less than 256, it is compared with the minimum ratio $K_L$ at a decision block 808. When the sum is more than the minimum ratio $K_L$, it is further compared with the maximum ratio $K_H$ at a decision block 810. If the sum exceeds the maximum ratio, the storage of the register A is replaced by the maximum ratio $K_H$ at the block 812.

If the feedback control ratio $\Delta I$ is smaller than 0, the sum of the feedback control ratio $\Delta I$ and the open loop control ratio $I_{OUT}$ are set in the register A at a block 814. Thereafter, the sum is compared with 0 at a decision block 816. When the sum is equal to or more than 0, the process skips to the decision block 808. At the block 208, if the sum is equal to or less than the minimum ratio $K_L$, the feedback control ratio $\Delta I$ is corrected to $\Delta I = K_L - I_{OUT}$, at the block 818. At the block 818, the minimum ratio $K_L$ replaces the sum in the storage of the register A. Likewise, when the sum is less than 0 at the decision block 816, the process of block 818 is carried out.

After the process at the block 818 or 812, the storage of the register A is transferred to the interface of the input/output unit to be outputted, at a block 820. Likewise, when the sum is less than the maximum ratio $K_H$ at the block 810, namely the sum is an intermediate ratio between the minimum and maximum ratios, the sum stored in the register A is transferred to the interface at the block 820. It should be appreciated the blocks 804 and 814 are provided to check the overflow of the sum of the feedback control ratio $\Delta I$ and the open loop control ratio $I_{OUT}$.

However, in the above-mentioned embodiment the minimum and maximum ratios are previously applied to limit the range of control signal variation, it will be possible to directly control the air flow rate. Namely, since the electronically controlled full injection system includes a means for determining air flow rate, such as an air flow meter, the input generated and transmitted from such air flow rate determining means can be used for defining maximum and minimum ratios of the engine idling speed control.

Upon starting the feed back control following the open loop control, the engine load is considerably varied depending on operating position of the air condition and/or gear position of the transmission. Therefore, the required air flow rate is varied accordingly. If the response of the feedback control corresponding to required air flow rate can not follow change of requirements, it will possibly cause engine stall. Therefore, the open loop control signal is defined by the minimum ratio to which the feedback control can easily follow. At this time, unevenness of various engine elements may be considered to determine the minimum ratio. By this, at the moment when control changes from feedback control to open loop control while the control signal is lower than the minimum ratio, the control signal is corrected to the minimum ratio of the control. Therefore, if the feedback control signal is excessive low with respect to the minimum ratio, increasing of control signal is too great for comfort of driving upon changing the control from feedback to open loop. This will also cause increasing of harmful components in the exhaust gas. To avoid such a problem, according to the present invention, the control signal is increased step by step, for example, 0.5% per 128 cycles of engine revolution, until the minimum ratio is reached.

Thus, the present invention fulfills all of the objects and advantages sought.

What is claimed is:

1. An intake air flow rate control system for a vehicle internal combustion engine in which either feedback control or open loop control is selectively carried out, in said feedback control, a feedback control ratio being determined based on an actual engine speed and a reference engine speed so that a difference between said actual engine speed and reference engine speed is reduced to zero and in said open loop control, an open loop control ratio being determined corresponding to an engine or engine coolant temperature, the system comprising in combination:
means for sensing said engine or engine coolant temperature;
means for sensing engine speed,
means for sensing engine load, a first means for determining said reference engine speed corresponding to said sensed engine or engine coolant temperature;

a second means for determining said open loop control ratio based on said sensed engine or engine coolant temperature and said sensed engine load;

a third means for sensing engine driving conditions and for selecting in response thereto one of said feedback control and said open loop control;

a fourth means responsive to said third means selecting said feedback control for determining said feedback control ratio based on said sensed engine speed and said reference engine speed;

a fifth means responsive to said third means selecting said open loop control for correcting said open loop control ratio in response to acceleration or deceleration of the vehicle;

a sixth means for limiting maximum and minimum values of said feedback and open loop control ratios for improving the response characteristics of the control system; and a seventh means for operating said first to sixth means in a predetermined order.

2. A control system as set forth in claim 1, further comprising means for sensing the voltage of a battery of said vehicle and an eighth means for correcting said open loop control ratio responsive to a drop in vehicle battery voltage for incrementing engine speed to recharge said battery, said eighth means being operated after operating said second means.

3. A control system as set forth in claim 1, wherein said first means determines said reference engine speed at a given constant speed when said engine or engine coolant temperature is in a range of normal ambient temperature range.

4. A control system as set forth in claim 1, 2 or 3, wherein said reference engine speed is corrected by a correction value based on the engine load condition determined by the kind of vehicle transmission, drive or neutral position of the transmission and the on or off position of an air conditioner, the correcting operation of the reference engine speed performed after operation of determining said reference engine speed by said first means.

5. A control system as set forth in claim 1, wherein said second means determines said control ratio which indicates a pulse duty to control the ratio of energized period and deenergized period of an actuator provided in an air flow rate control valve interposed within an air intake passage for flowing the intake air for delivering the air to the combustion engine, and wherein said engine load condition is determined corresponding to kind of transmission, drive or neutral range of the transmission gear position and on or off of an air conditioner.

6. A control system as set forth in claim 4, wherein said second means determines a minimum control ratio, and said minimum control ratio is varied corresponding to said engine load condition.

7. A control system as set forth in claim 1, wherein said third means determines said feedback control condition which is a throttle valve provided in an air intake passage being entirely closed and engine being driven stably.

8. A control system as forth in claim 6, wherein said third means determines that engine is driven stable when the transmission or clutch is in neutral gear position or the vehicle speed is less than or equal to a given speed, and fuel supply system is not fuel shut off condition.

9. A control system as set forth in claim 7, wherein said third means is not operative to switch control operation between feedback control and open loop control if the difference between the actual engine speed and the reference between the actual engine speed and the reference engine speed is within a given range.

10. A control system as set forth in claim 1, wherein said fourth means determines said control ratio indicative of a pulse duty of a pulse signal to vary the ratio of energized period and deenergized period of an actuator for controlling opening and closing an air flow rate control valve, said control ratio is defined a proportional constant of a proportional element of a control signal generator and an integral constant of integral element of said control signal generator, and said proportional constant is determined corresponding to said actual engine speed and said integral constant is determined corresponding to said actual engine speed and said difference between the actual engine speed and the reference engine speed.

11. A control system as set forth in claim 1, wherein said fifth means is operative responsive to opening and closing of a throttle valve means to temporarily increase control ratio to increase air flow rate responsive to increasing of required rate, said fifth means decreases said corrected control ratio until it returns to normal range in a given rate and a given timing.

12. An intake air flow rate control system for a vehicle internal combustion engine in which either feedback control or open loop control is carried out selectively, in said feedback control, a feedback control ratio being determined based on an actual engine speed and a reference engine speed so that a difference between said actual engine speed and reference engine speed is reduced to zero, and in open loop control, an open loop control ratio being determined based on engine or engine coolant temperature, wherein the system comprises in combination:

a first sensor means for determining said engine or engine coolant temperature and generating a first sensor signal indicative of said determined engine or engine coolant temperature;

a second sensor means for determining actual engine speed and generating a second sensor signal indicative of the determined actual engine speed;

a third sensor means for detecting the position of a throttle valve of said engine and generating a third sensor signal when it detects the position of said throttle valve being fully closed;

a fourth sensor means for detecting the gear position of a transmission of said vehicle and generating a fourth sensor signal when it detects the transmission being in neutral gear position;

a fifth sensor means for detecting vehicle speed and generating a fifth sensor signal when the vehicle speed is less than a given speed; and a microcomputer selectively operating said vehicle for feedback control or open loop control, said microcomputer including a sixth means for determining a basic reference engine speed based on said first sensor signal, a seventh means for determining a correction rate for correcting said basic reference engine speed corresponding to an engine load condition, an eighth means for determining a basic control ratio corresponding to said reference engine speed and correcting said basic control ratio corresponding to said engine load, a ninth means for determining an engine driving condition based on said third to fifth sensor signals and based on whether a fuel supply device supplying fuel to said engine is in a shut off condition, and carrying out feedback control responsive to said third sensor signal and detecting of said stable driving condition of said engine and carrying out open loop control otherwise, a tenth means for determining said feedback control ratio based on said actual engine speed and said difference between said actual engine speed and corrected basic reference engine speed and an eleventh means for limiting maximum and minimum ratio of said control ratio and correcting said control ratio in response to said third sensor signal, said microcomputer operating said sixth to eleventh means in a predetermined order.

13. A control system as set forth in claim 12, wherein said system further comprises a twelveth means for correcting said reference engine speed in response to dropping of vehicle vattery voltage, said twelveth means is operative after operating the second means.

14. A control system as set forth in claim 12 or 13, wherein said system permits manually controlling said reference engine speed by increasing or decreasing the register voltage indicative of said reference engine speed at a given rate.

15. A control system as set forth in claim 12, wherein said first means determines said reference engine speed at a given constant speed when said engine or engine coolant temperature is in a range of normal ambient temperature range.

16. A control system as set forth in claim 12 or 13 wherein said reference engine speed is corrected corresponding to the engine load condition which is determined based on kind of transmission, drive or neutral range of the transmission gear position and on or off of air conditioner, the correcting operation of the reference engine speed is issued after operation of determining said reference engine speed of said first means.

17. A control system as set forth in claim 12, wherein said second means determines said control ratio which indicates a pulse duty to control the ratio of energized period and deenergized period of an actuator provided in an air flow rate control valve interposed within an air intake passage for flowing the intake air for delivering the air to the combustion engine, and wherein said engine load condition is determined corresponding to kind of transmission, drive or neutral range of the transmission gear position and on or off of an air conditioner.

18. A control system as set forth in claim 16, wherein said second means determines a minimum control ratio, and said minimum control ratio is varied corresponding to said engine load condition.

19. A control system as set forth in claim 12, wherein said third means determines said feedback control condition which is a throttle valve provided in an air intake passage being entirely closed and engine being driven stably.

20. A control system as forth in claim 18, wherein said third means determines that engine is driven stable when the transmission or clutch is in neutral gear position or the vehicle speed is less than or equal to a given speed, and fuel supply system is not fuel shut off condition.

21. A control system as set forth in claim 18, wherein said third means is not operative to switch control operation between feedback control and open loop control if the difference between the actual engine speed and the reference between the actual engine speed and the reference engine speed is within a given range.

22. A control system as set forth in claim 12, wherein said fourth means determines said control ratio indicative of a pulse duty of a pulse signal to vary the ratio of energized period and deenergized period of an actuator for controlling opening and closing an air flow rate control valve, said control ratio is defined a proportional constant of a proportional element of a control signal generator and an integral constant of integral element of said control signal generator, and said proportional constant is determined corresponding to said actual engine speed and said integral constant is determined corresponding to said actual engine speed and said difference between the actual engine speed and the reference engine speed.

23. A control system as set forth in claim 12, wherein said fifth means is operative responsive to opening and closing of a throttle valve means to temporarily increase control ratio to increase air flow rate responsive to increasing of required rate, said fifth means decreases said corrected control ratio until it returns to normal range in a given rate and a given timing.

24. In an intake air flow rate control system for controlling an air flow rate delivered to an internal combustion engine in idle engine condition, including a bypass passage bypassing a throttle valve provided in said air intake passage, a controlling means for controlling the amount of air flowing through said bypass passage, in said system, either feedback control or open loop control is selectively carried out, in said feedback control, a control ratio for determining a ratio of activating period and inactivating period of said controlling means being determined corresponding to an actual engine speed and a reference engine speed so that a difference between said actual engine speed and the reference engine speed is reduced to zero and in said open loop control, said control ratio being determined corresponding to an engine or engine coolant ratio being determined corresponding to an engine or engine coolant temperature,
 a method for controlling intake air flow rate comprising:
 determining a basic reference engine speed corresponding to engine or engine coolant temperature;
 determining engine load applied to said internal combustion engine based on various sensor signal each of which is indicating said engine load;
 correcting said basic reference engine speed based on determined engine load;
 determining a basic control ratio for open loop control corresponding to said engine coolant temperature and correcting said basic open loop control ratio based on determined engine load condition;
 detecting a throttle valve closed position and stable engine driving condition and carrying out feedback control responsive to detecting the throttle valve closed position and stable engine driving condition or carrying out open loop control otherwise;
 determining control ratio for feedback control based on said actual engine speed and said reference engine speed so that determines a proportional constant of a proportional element of a control signal generator and an integral constant of an integral element of the control signal generator to determine pulse duty of pulse signal;
 determining maximum and minimum ratio of said control ratio so that said control ratio does not enter into a dead band of said controlling means in which said controlling means causes delay of response; and correcting said control ratio to increase the ratio responsive to acceleration of the vehicle and to decrease the ratio in response to deceleration of the vehicle.

25. A method as set forth in claim 24, wherein said system further comprises a step for correcting said reference engine speed in response to dropping of vehicle vattery voltage, said correction is carried out after operating the second means.

26. A method as set forth in claim 24 or 25, wherein manually control is permitted to control said reference engine speed by increasing or decreasing the register voltage indicative of said reference engine speed at a given rate.

27. A method as set forth in claim 24, wherein said step for determing the reference engine speed determines said reference engine speed at a given constant speed when said engine or engine coolant temperature is in a range of normal ambient temperature range.

28. A method as set forth in claim 24, 25 or 26, wherein said reference engine speed is corrected corresponding to the engine load condition which is determined based on kind of transmission, drive or neutral range of the transmission gear position and on or off of air conditoner, the correcting operation of the reference engine speed is issued after operation of said step for determining said reference engine speed.

29. A method as set forth in claim 24, wherein said step for determining basic control ratio for open loop control determines said control ratio which indicates a pulse duty to control the ratio of energized period and deenergized period of an actuator provided in an air flow rate control valve interposed within an air intake passage for flowing the intake air for delivering the air to the combustion engine, and wherein said engine load condition is determined corresponding to kind of transmission, drive or neutral range of the transmission gear position and on or off of an air conditioner.

30. A method as set forth in claim 28, wherein said step for determining basic control ratio determines a minimum control ratio, and said minimum control ratio is varied corresponding to said engine load condition.

31. A method as set forth in claim 24, wherein said step for selectively carrying out feedback control and open loop control determines said feedback control condition which is a throttle valve provided in an air intake passage being entirely closed and engine being driven stably.

32. A method as forth in claim 31, wherein said step determines that engine is driven stable when the transmission or clutch is in neutral gear position or the vehicle speed is less than or equal to a given speed, and fuel supply system is not fuel shut off condition.

33. A method as set forth in claim 31, wherein said step is not operative to switch control operation between feedback control and open loop control if the difference between the actual engine speed and the reference between the actual engine speed and the reference engine speed is within a given range.

34. A method as set forth in claim 24, wherein said step for determining feedback control ratio determines said control ratio indicative of a pulse duty of a pulse signal to vary the ratio of energized period and deenergized period of an actuator for controlling opening and closing an air flow rate control valve, said control ratio is defined a proportional constant of a proportional element of a control signal generator and an integral constant of integral element of said control signal generator, and said proportional constant is determined corresponding to said actual engine speed and said integral constant is determined corresponding to said actual engine speed and said difference between the actual engine speed and the reference engine speed.

35. A method as set forth in claim 24, wherein said step for correcting said control ration responsive to acceleration or deceleration of the vehicle is operative responsive to opening and closing of a throttle valve means to temporarily increase control ratio to increase air flow rate responsive to increasing of required rate, said step decreases said corrected control ratio until it returns to normal range in a given rate and a given timing.

36. An intake idle air flow rate control system for a vehicle internal combustion engine in which either feedback control or open loop control is selectively carried out, in said feedback control, a feedback control ratio being determined based on an actual engine speed and a reference engine speed so that a difference between said actual engine speed and reference engine speed is minimized and in said open loop control, an open loop control ratio being determined corresponding to an engine or engine coolant temperature, the system comprising:
means for sensing said engine or engine coolant temperature;
means for sensing said engine speed,
means for sensing engine load,
a first means for determining said reference engine speed corresponding to said engine or engine coolant temperature;
a second means for determining said open loop control ratio based on said sensed engine or engine coolant temperature and said sensed engine load condition;
a third means for sensing engine driving conditions and for selecting in response thereto one of said feedback control and open loop control; and
a fourth means responsive to said third means selecting said feedback control for determining said feedback control ratio based on said sensed engine speed and said reference engine speed.

37. An intake idle air flow rate control system for a vehicle internal combustion engine in which either feedback control or open loop control is selectively carried out, in said feedback control, a feedback control ratio being determined based on an actual engine speed and a reference engine speed so that a difference between said actual engine speed and reference engine speed is minimized and in said open loop control, an open loop control ratio being determined corresponding to an engine or engine coolant temperature, the system comprising:
means for sensing engine or engine coolant temperature,
means for sensing engine speed,
means for determining said reference engine speed corresponding to said engine or engine coolant temperature;
means for sensing engine driving conditions and for selecting in response thereto one of said feedback control and open loop control; and
means responsive to feedback control selected by said sensing and selecting means for determining said feedback control ratio based on said sensed engine speed and said reference engine speed.

38. An intake idle air flow rate control system for a vehicle internal combustion engine in which either feedback control or open loop control is selectively carried out, in said feedback control, a feedback control ratio being determined based on an actual engine speed and a reference engine speed so that a difference between said actual engine speed and reference engine speed is minimized and in said open loop control, an open loop control ratio being determined corresponding to an engine or engine coolant temperature, the system comprising in combination:
means for sensing engine or engine coolant temperature;
means for sensing engine speed;
means for determining said reference engine speed corresponding to said engine or engine coolant temperature;
means for sensing engine driving conditions and for selecting in response thereto one of said feedback control and open loop control;
means responsive to selection of feedback control by said sensing and selecting means for determining said feedback control ratio based on said sensed engine speed and said reference engine speed; and
means responsive to selection of open loop control by said sensing and selecting means for correcting said open loop control ratio in response to acceleration or deceleration of the vehicle.

39. An intake idle air flow rate control system for a vehicle internal combustion engine in which either feedback control or open loop control is selectively carried out, in said feedback control, a feedback control ratio being determined based on an actual engine speed and a reference engine speed so that a difference between said actual engine speed and reference engine speed is minimized and in said open loop control, an open loop control ratio being determined corresponding to an engine or engine coolant temperature, the system comprising:
means for sensing engine or engine coolant temperature,
means for sensing engine speed,
means for determining said reference engine speed corresponding to said engine or engine coolant temperature;
means for sensing engine driving conditions and for selecting in response thereto one of said feedback control and open loop control;
means responsive to selection of feedback control by said sensing and selecting means for determining said feedback control ratio based on said sensed engine speed and said reference engine speed; and
means for limiting maximum and minimum values of said feedback and open loop control ratios for improving the response characteristics of the control system.

40. An intake idle air flow rate control system for a vehicle internal combustion engine in which either feedback control or open loop control is selectively carried out, in said feedback control, a feedback control ratio being determined based on an actual engine speed and a reference engine speed so that a difference between said actual engine speed and reference engine speed is minimized and in said open loop control, an open loop control ratio being determined corresponding to an engine or engine coolant temperature, the system comprising:
means for sensing engine or engine coolant temperature,
means for sensing engine load,
means for determining said reference engine speed corresponding to said engine or engine coolant temperature;
means for determining said open loop control ratio based on said sensed engine or engine coolant temperature and said sensed engine load condition; and
means for correcting said open loop control ratio in response to acceleration or deceleration of the vehicle.

41. An intake idle air flow rate control system for a vehicle internal combustion engine in which either feedback control or open loop control is selectively carried out, in said said feedback control, a feedback control ratio being determined based on an actual engine speed and a reference engine speed so that a difference between said actual engine speed and reference engine speed is minimized and in said open loop control, an open loop control ratio being determined corresponding to an engine or engine coolant temperature, the system comprising:
means for sensing engine or engine coolant temperature,
means for sensing engine load,
means for determining said reference engine speed corresponding to said engine or engine coolant temperature;
means for determining said open loop control ratio based on said sensed engine or engine coolant temperature and said sensed engine load condition; and
means for limiting maximum and minimum values of said feedback and open loop control ratios for improving the response characteristics of the control system.

42. An intake idle air flow rate control system for a vehicle internal combustion engine in which either feedback control or open loop control is selectively carried out, in said feedback control, a feedback control ratio being determined based on an actual engine speed and a reference engine speed so that a difference between said actual engine speed and reference engine speed is minimized and in said open loop control, an open loop control ratio being determined corresponding to an engine or engine coolant temperature, the system comprising:
means for sensing engine or engine coolant temperature,
means for sensing engine load,
means for determining said reference engine speed corresponding to said engine or engine coolant temperature;
means for determining said open loop control ratio based on said sensed engine or engine coolant temperature and said sensed engine load condition;
means for correcting said open loop control ratio in response to acceleration or deceleration of the vehicle; and
means for limiting maximum and minimum values of said feedback and open loop control ratios for improving the response characteristics of the control system.

43. An intake idle air flow rate control system for a vehicle internal combustion engine in which either feedback control or open loop control is selectively carried out, in said feedback control, a feedback control ratio being determined based on an actual engine speed and a reference engine speed so that a difference between said actual engine speed and reference engine speed is minimized and in said open loop control, an open loop control ratio being determined corresponding to an engine or engine coolant temperature, the system comprising:
means for sensing said engine or engine coolant temperature,
means for sensing said engine speed,
means for sensing engine load,
a first means for determining said reference engine speed corresponding to said engine or engine coolant temperature;
a second means for determining said open loop control ratio based on said sensed engine or engine coolant temperature and said sensed engine load condition;
a third means for sensing engine driving conditions and for selecting in response thereto one of said feedback control and open loop control;
a fourth means responsive to selection of feedback control by said third means for determining said feedback control ratio based on said sensed engine speed and said reference engine speed;
means responsive to selection of open loop control by said sensing and selecting means for correcting said open loop control ratio responsive to acceleration or deceleration of the vehicle; and
means for limiting maximum and minimum values of said feedback and open loop control ratios for improving the response characteristics of the control system.

44. A control system as set forth in any one of claims 36 to 43, wherein said means for determining said reference engine speed means determines said reference engine speed at a given constant speed when said engine or engine coolant temperature is in a range of normal ambient temperature range.

45. A control system as set forth in claim 44, wherein said vehicle has one of a manual or automatic transmission and has an air conditioning unit and wherein said reference engine speed is corrected corresponding to the engine load condition which is determined based on the kind of transmission, the drive or neutral range of the transmission gear position and the on or off condition of the air conditioning unit, the correcting operation of the reference engine speed being effective after determination of said reference engine speed.

46. A control system as set forth in any one of claims 36, 40, 41 and 42, wherein said means for determining said open loop control ratio determines a minimum control ratio, said minimum control ratio being varied in dependence upon said engine load condition.

47. A control system as set forth in any one of claims 35, 37, 38 and 39, wherein said sensing and selecting means selects said feedback control by sensing a closed position of a throttle valve provided in an air intake passage of said vehicle and sensing a stable driving condition of said engine.

48. A control system as set forth in claim 47, wherein said sensing and selecting means is inhibited from switching control operation between feedback control and open loop control if the difference between the actual engine speed and the reference engine speed is within a given range.

49. A control system as set forth in any one of claims 33, 40 and 42, wherein said correcting means is operative in response to opening and closing of a throttle valve of said vehicle to temporarily increase said control ratios to increase said air flow rate in response to increasing of a required rate, said correcting means decreasing said corrected control ratios to return same to a normal range within a given time interval.

50. An intake idle air flow rate control system for a vehicle internal combustion engine in which either feedback control or open loop control is carried out selectively, in said feedback control a feedback control ratio being determined based on an actual engine speed and a reference engine speed so that a difference between said actual engine speed and a reference engine speed is reduced to zero, and in open loop control, said open loop control ratio being determined based on engine or engine coolant temperature, wherein the system comprises in combination:
a first sensor means for determining said engine or engine coolant temperature and in response generating a first sensor signal indicative of said determined engine or engine coolant temperature;
a second sensor means for determining actual engine speed and in response generating a second sensor signal indicative of the determined actual engine speed;
a microcomputer selectively operating said vehicle for feedback control or open loop control, said microcomputer including means for determining a basic reference engine speed based on said first sensor signal, a means for carrying out feedback control when the engine is driven in a stable driving condition and for carrying out open loop control otherwise, and means for determining the feedback control ratio based on said actual engine speed and said difference between said actual engine speed and reference engine speed.

51. An intake idle air flow rate control system for a vehicle internal combustion engine in which either feedback control or open loop control is carried out selectively, in said feedback control a feedback control ratio being determined based on an actual engine speed and a reference engine speed so that a difference between said actual engine speed and reference engine speed is reduced to zero, and in open loop control, said open loop control ratio being determined based on engine or engine coolant temperature, wherein the system comprises in combination:
a first sensor means for determining said engine or engine coolant temperature and in response generating a first sensor signal indicative of said determined engine or engine coolant temperature;
a second sensor means for determining actual engine speed and in response generating a second sensor signal indicative of the determined actual engine speed;
a third sensor means for detecting a third sensor signal upon detecting a closed position of said throttle valve;
a microcomputer selectively operating said vehicle for feedback control or open loop control, said microcomputer including a means for determining a basic reference engine speed based on said first sensor signal, means for determining a basic control ratio corresponding to said reference engine speed, said microcomputer carrying out feedback control in response to said third sensor signal and upon detecting of a stable driving condition of said engine, and carrying out open loop control otherwise, the control ratio for feedback control being based on said actual engine speed and said difference between said actual engine speed and reference engine speed.

52. An intake idle air flow rate control system for a vehicle internal combustion engine in which either feedback control or open loop control is carried out selectively, in said feedback control a feedback control ratio being determined based on an actual engine speed and a reference engine speed so that a difference between said actual engine speed and reference engine speed is reduced to zero, and in open loop control, said open loop control ratio being determined based on engine or engine coolant temperature, wherein the system comprises in combination:
- a first sensor means for determining said engine or engine coolant temperature and in response generating a first sensor signal indicative of said determined engine or engine coolant temperature;
- a second sensor means for determining actual engine speed and in response generating a second sensor signal indicative of the determined actual engine speed;
- a third sensor means for detecting a position of a vehicle throttle valve and in response generating a third sensor signal upon detecting a closed position of said throttle valve;
- a microcomputer selectively operating said vehicle for feedback control or open loop control, said microcomputer including a means for determining a basic reference engine speed based on said first sensor signal, means for determining a correction rate for correcting said reference engine speed corresponding to an engine load condition, means for determining a basic control ratio corresponding to said reference engine speed and correcting said basic control ratio corresponding to said engine load, means for determining an engine driving condition based on said third to fifth sensor signals and for carrying out feedback control in response to said third sensor signal and the detection of a stable driving condition of said engine and carrying out open loop control otherwise, and a means for determining said feedback control ratio based on said actual engine speed and said difference between said actual engine speed and reference engine speed.

53. An intake idle air flow rate control system for a vehicle internal combustion engine in which either feedback control or open loop control is carried out selectively, in said feedback control a feedback control ratio being determined based on an actual engine speed and a reference engine speed so that a difference between said actual engine speed and reference engine speed is reduced to zero, and in open loop control, said open loop control being determined based on engine or engine coolant temperature;

wherein the system comprises in combination:
- a first sensor means for determining said engine or engine coolant temperature and in response generating a first sensor signal indicative of said determined engine or engine coolant temperature;
- a second sensor means for determining actual engine speed and in response generating a second sensor signal indicative of the determined actual engine speed;
- a third sensor means for detecting a position of a vehicle throttle valve and in response generating a third sensor signal upon detecting a closed position of said throttle valve;
- a fourth sensor means for detecting a gear position of a transmission or clutch of said vehicle and in response generating a fourth sensor signal upon detection of said transmission being in neutral gear position;
- a microcomputer selectively operating said vehicle for feedback control or open loop control, said microcomputer including a means for determining a basic reference engine speed based on said first sensor signal, means for determining a correction rate for correcting said reference engine speed corresponding to an engine load condition, means for determining a basic control ratio corresponding to said reference engine speed and correcting said basic control ratio corresponding to said engine load, means for determining an engine driving condition based on said third to fifth sensor signals and carrying out feedback control in response to said third sensor signal and the detection of a stable engine driving condition and carrying out open loop control otherwise, means for determining said feedback control ratio based on said actual engine speed and said difference between said actual engine speed and reference engine speed and means for limiting the maximum and minimum control ratios and correcting said control ratios in response to said third sensor signal.

54. A control system as set forth in any one of claims 50, 51, 52 and 53, wherein said system further comprises means for correcting said reference engine speed in response to dropping of a vehicle battery voltage, said means operative after operating the second means.

55. A control system as set forth in any one of claims 50, 51, 52 and 53, wherein said vehicle has an idle air flow control valve and an actuator for actuating same and one of a manual or automatic transmission as well as an air conditioning unit and wherein second means determines said control ratios which indicate a pulse duty cycle to control the ratio of an energized period and a deenergized period of said actuator, said idle air flow control valve interposed within an air intake passage delivering air to the combustion engine, and wherein said engine load condition is determined corresponding to the kind of transmission, the drive or neutral transmission gear position and the on or off condition of said air conditioning unit.

56. In an intake air flow rate control system for controlling an air flow rate delivered to an internal combustion engine having a bypass passage bypassing a throttle valve provided in said air intake passage, a controlling means for controlling the amount of air flowing through said bypass passage, and wherein in said system either feedback control or open loop control is selectively carried out, in said feedback control, a control ratio for determining a ratio of an activating period and an inactivating period of said controlling means being determined based on an actual engine speed and a reference engine speed so that a difference between said actual engine speed and the reference engine speed is reduced to zero, and in said open loop control, said control ratio being determined corresponding to an engine or engine coolant temperature;

a method for controlling intake air flow rate comprising:

determining a basic reference engine speed corresponding to said engine or engine coolant temperature;

determining an engine load applied to said internal combustion engine;

determining a basic control ratio for open loop control corresponding to said engine coolant temperature and correcting said basic open loop control ratio based on said determined engine load;

detecting a closed position of a throttle valve and a stable engine driving condition and carrying out feedback control in response thereto and otherwise carrying out open loop control; and determining the control ratio for feedback control based on said actual engine speed and said reference engine speed so that a proportional constant is determined for a proportional element of a control signal generator an an integral constant of an integral element of the control signal generator to determine the pulse duty cycle of a pulse signal fed to said controlling means.

57. In an intake air flow rate control system for controlling an air flow rate delivered to an internal combustion engine having a bypass passage bypassing a throttle valve provided in said air intake passage, or controlling means for controlling the amount of air flowing through said bypass passage, and wherein in said system either feedback control or open loop control is selectively carried out, in said feedback control, a control ratio for determining a ratio of an activating period and an inactivating period of said controlling means being determined based on an actual engine speed and a reference engine speed so that a difference between said actual engine speed and the reference engine speed is reduced to zero, and in said open loop control, said control ratio being determined corresponding to an engine or engine coolant temperature, a method for controlling intake air flow rate comprising:

determining a basic reference engine speed corresponding to said engine or engine coolant temperature;

determining a basic control ratio for open loop control corresponding to said engine or engine coolant temperature;

carrying out feedback control when the vehicle throttle valve is fully closed and carrying out open loop control otherwise;

determining a control ratio for feedback control based on said actual engine speed and said reference engine speed so that a proportional constant is determined for a proportional element of a control signal generator and an integral constant of an integral element of the control signal generator to determine the pulse duty cycle of a pulse signal fed to said controlling means.

58. A method as set forth in claim 56 or 57, wherein said system further comprises the step of correcting said reference engine speed in response to dropping of vehicle battery voltages.

59. A method as set forth in claim 56 or 57, wherein said step of determining the reference engine speed determines said reference engine speed at a given constant speed when said engine or engine coolant temperature is in a normal ambient temperature range.

60. A method as set forth in claim 59, wherein said reference engine speed is corrected corresponding to the engine load speed is corrected corresponding to the engine load condition which is determined based on kind of vehicle transmission, selected drive or neutral transmission gear position and on or off condition of a vehicle air conditioner, the correcting operation of the reference engine speed issued after operation of said step for determining said reference engine speed.

61. A method as set forth in claim 56 or 57, wherein said step of determining the basic control ratio for open loop control determines said control ratio which indicates a pulse duty cycle to control the ratio of an energized period and a deenergized period of an actuator forming part of said controlling means, and wherein said engine load condition is determined corresponding to kind of vehicle transmission, drive or neutral transmission gear position and on or off condition of a vehicle air conditioner.

62. A method as set forth in claim 60, wherein said step for determining the basic control ratio determines a minimum control ratio, said minimum control ratio being varied corresponding to said engine load condition.

63. A control system as set forth in any one of claims 36 to 43, wherein said system further comprises means for correcting said control ratios in response to a drop of vehicle battery voltage for recharging same.

* * * * *